United States Patent
Lin et al.

(10) Patent No.: US 10,904,923 B2
(45) Date of Patent: *Jan. 26, 2021

(54) FREQUENCY HOPPING FOR RANDOM ACCESS

(71) Applicant: Telefonaktiebolaget LM Ericsson (publ), Stockholm (SE)

(72) Inventors: Xingqin Lin, Santa Clara, CA (US); Ansuman Adhikary, Hyderabad (IN); Johan Bergman, Stockholm (SE); Yufei Blankenship, Kildeer, IL (US); Asbjörn Grövlen, Stockholm (SE); Hazhir Shokri Razaghi, Kista (SE); Yutao Sui, Solna (SE); Yi-Pin Eric Wang, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 20 days.

This patent is subject to a terminal disclaimer.

(21) Appl. No.: 16/073,629

(22) PCT Filed: Jan. 27, 2017

(86) PCT No.: PCT/SE2017/050072
§ 371 (c)(1),
(2) Date: Jul. 27, 2018

(87) PCT Pub. No.: WO2017/131577
PCT Pub. Date: Aug. 3, 2017

(65) Prior Publication Data
US 2019/0141751 A1 May 9, 2019

Related U.S. Application Data

(60) Provisional application No. 62/288,633, filed on Jan. 29, 2016, provisional application No. 62/288,436, filed on Jan. 29, 2016.

(51) Int. Cl.
*H04B 1/7143* (2011.01)
*H04B 1/713* (2011.01)
(Continued)

(52) U.S. Cl.
CPC ........ *H04W 74/0833* (2013.01); *H04B 1/713* (2013.01); *H04B 1/7143* (2013.01);
(Continued)

(58) Field of Classification Search
CPC ..... H04L 5/0012; H04L 5/0048; H04L 27/26; H04W 74/002; H04W 74/004;
(Continued)

(56) References Cited

U.S. PATENT DOCUMENTS 6,847,678 B2   1/2005   Berezdivin et al.
8,199,778 B2   6/2012   Shimomura et al.
(Continued)

FOREIGN PATENT DOCUMENTS

CN   101162921 A   4/2008
CN   101569231 A   10/2009
(Continued)

OTHER PUBLICATIONS

Ericsson, "NB-IoT—Design Considerations for Single Tone Frequency Hopped NB-PRACH", 3GPP TSG-RAN1 NB-IOT Ad Hoc, Jan. 18-20, 2016, pp. 1-7, Budapest, Hungary, R1-160093.
(Continued)

*Primary Examiner* — Harun Chowdhury
(74) *Attorney, Agent, or Firm* — Coats & Bennett, PLLC

(57) ABSTRACT

A wireless communication device (14) (e.g., a user equipment) in a wireless communication system (10) is configured for transmitting a random access preamble signal (16). The wireless communication device (14) in particular is configured to generate a random access preamble signal (16) that comprises multiple symbol groups (18), with each
(Continued)

symbol group (18) on a single tone during a different time resource, according to a frequency hopping pattern that hops the random access preamble signal (16) a fixed frequency distance at one or more symbol groups (18) and hops the random access preamble signal (16) a pseudo random frequency distance at one or more other symbol groups (18). Each symbol group (18) comprises one or more symbols. The wireless communication device (14) is also configured to transmit the random access preamble signal (16).

29 Claims, 28 Drawing Sheets

(51) Int. Cl.
*H04W 74/08* (2009.01)
*H04W 4/80* (2018.01)
*H04L 5/00* (2006.01)
*H04L 27/26* (2006.01)
*H04W 72/04* (2009.01)

(52) U.S. Cl.
CPC ........ *H04L 5/0012* (2013.01); *H04L 27/2607* (2013.01); *H04L 27/2614* (2013.01); *H04W 4/80* (2018.02); *H04W 72/0453* (2013.01)

(58) Field of Classification Search
CPC . H04W 74/006; H04W 74/008; H04W 74/04; H04W 74/0833; H04W 72/0453; H04B 1/713; H04B 1/7143
USPC ................................. 370/252, 328, 329, 336
See application file for complete search history.

(56) References Cited

U.S. PATENT DOCUMENTS

| | | | |
|---|---|---|---|
| 9,756,662 B2* | 9/2017 | Lin | H04W 74/0833 |
| 10,090,880 B2 | 10/2018 | Wang et al. | |
| 10,334,633 B2 | 6/2019 | Gaal et al. | |
| 2010/0296451 A1 | 11/2010 | Li et al. | |
| 2012/0188986 A1 | 7/2012 | Kawasaki et al. | |
| 2015/0319779 A1 | 11/2015 | Li et al. | |
| 2015/0365977 A1 | 12/2015 | Tabet et al. | |
| 2017/0134199 A1* | 5/2017 | Wang | H04W 74/0833 |
| 2017/0202028 A1* | 7/2017 | Gaal | H04W 72/0453 |
| 2019/0028143 A1* | 1/2019 | Zhang | H04W 74/0833 |

FOREIGN PATENT DOCUMENTS

| | | |
|---|---|---|
| EP | 2180757 A1 | 4/2010 |
| JP | 2002542652 A | 12/2002 |
| JP | 2010536277 A | 11/2010 |
| JP | 2018537923 A | 12/2018 |
| JP | 2019506792 A | 3/2019 |
| RU | 2339170 C2 | 11/2008 |
| WO | 0062438 A1 | 10/2000 |
| WO | 2007051159 A2 | 5/2007 |
| WO | 2008101055 A2 | 8/2008 |
| WO | 2009115563 A1 | 9/2009 |

OTHER PUBLICATIONS

Huawei et al., "NB-PRACH design", 3GPP TSG RAN WG1 NB-IoT Ad-Hoc Meeting, Jan. 18-20, 2016, pp. 1-7, Budapest, Hungary, R1-160025.
Ericsson, "NB-IoT—NB PRACH Evaluations", 3GPP TSG-RAN1 #84, Feb. 15-19, 2016, pp. 1-6, St. Julian's, Malta, R1-160276.
3rd Generation Partnership Project, "RAN1 Chairman's Notes", Jan. 18-20, 2016, pp. 1-9, Budapest, Hungary.
Qualcomm Incorporated, "Random Access Channel Design" 3GPP TSG RAN WG1 NB-IoT, Jan. 18-20, 2016, Budapest, Hungary, R1-160110.
Ericsson, "Narrowband IoT—Random Access Design", 3GPP TSG-RAN1 #83, Nov. 15-22, 2015, pp. 1-10, Anaheim, US, R1-157424.
Huawei et al., "Revised Work Item: Narrowband IoT (NB-IoT)", 3GPP TSG RAN Meeting #70, Dec. 7-10, 2015, pp. 1-9, Sitges, Spain, RP-152284.
Qualcomm Incorporated, "New Work Item: NarrowBand Iot (NB-Iot)", 3GPP TSG RAN Meeting #69, Sep. 14-16, 2015, pp. 1-9, Phoenix, US, RP-151621.
3rd Generation Partnership Project, "Technical Specification Group Radio Access Network; Evolved Universal Terrestrial Radio Access (E-UTRA); Physical channels and modulation (Release 12)", 3GPP TS 36.211 V12.8.0, Dec. 2015, pp. 1-136.
3rd Generation Partnership Project, "Technical Specification Group Radio Access Network; Evolved Universal Terrestrial Radio Access (E-UTRA); Physical layer procedures (Release 12)", 3GPP TS 36.213 V12.8.0, Dec. 2015, pp. 1-241.
3rd Generation Partnership Project, "Technical Specification Group GSM/EDGE Radio Access Network; Cellular system support for ultra-low complexity and low throughput Internet of Things (CIoT) (Release 13)", 3GPP TR 45.820 V13.0.0, Aug. 2015, pp. 1-495.
Qualcomm Incorporated, Narrow band OFDMA—Random Access, 3GPP TSG GERAN #64, San Francisco, USA, Nov. 17-21, 2014, Tdoc GP-140840.

* cited by examiner

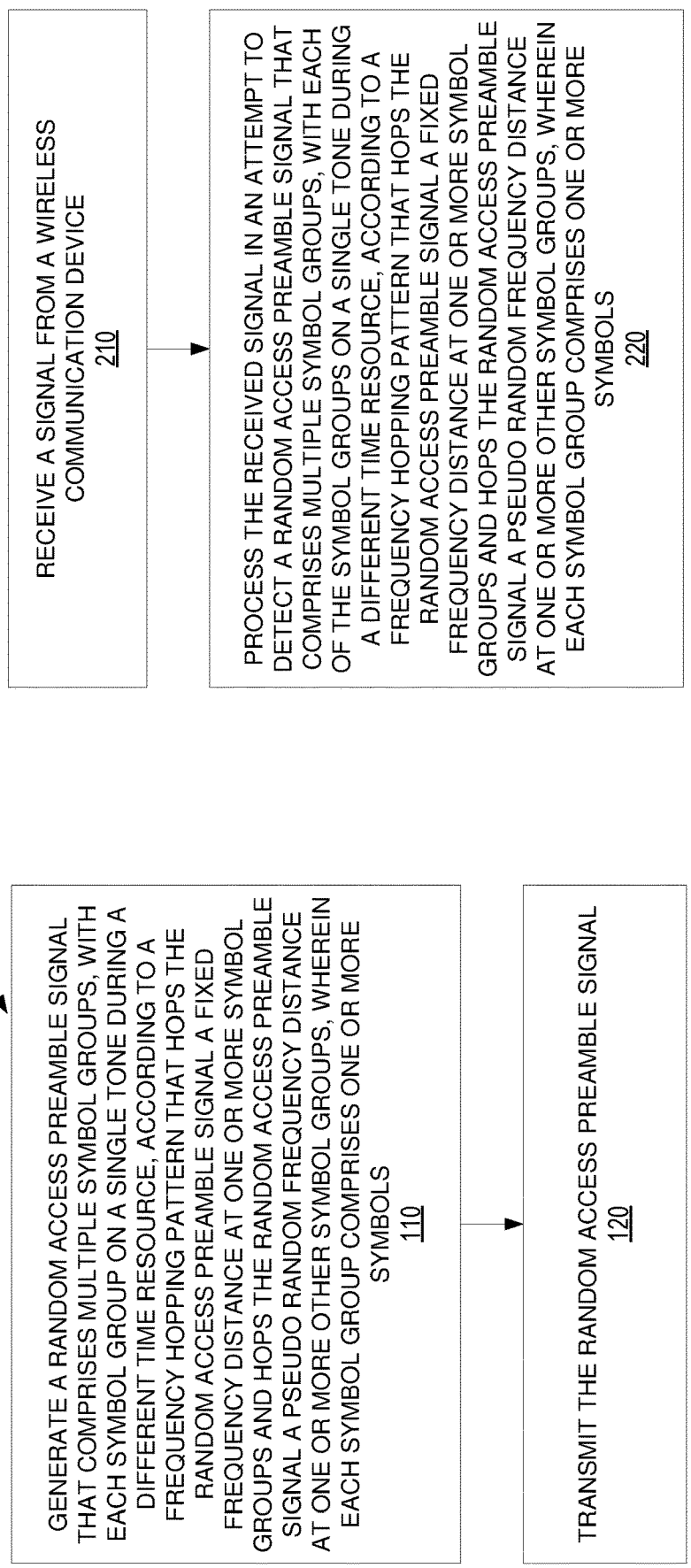

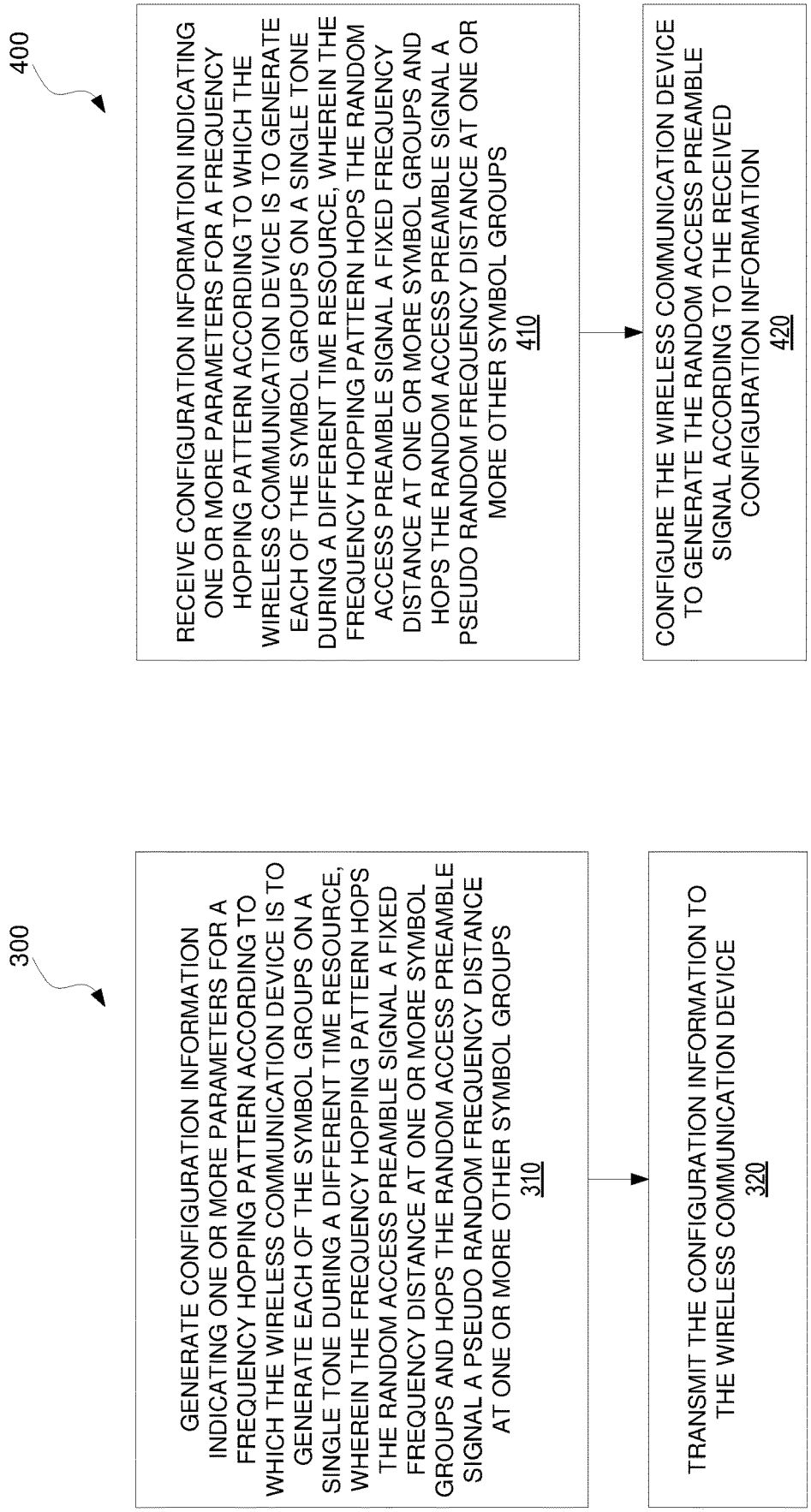

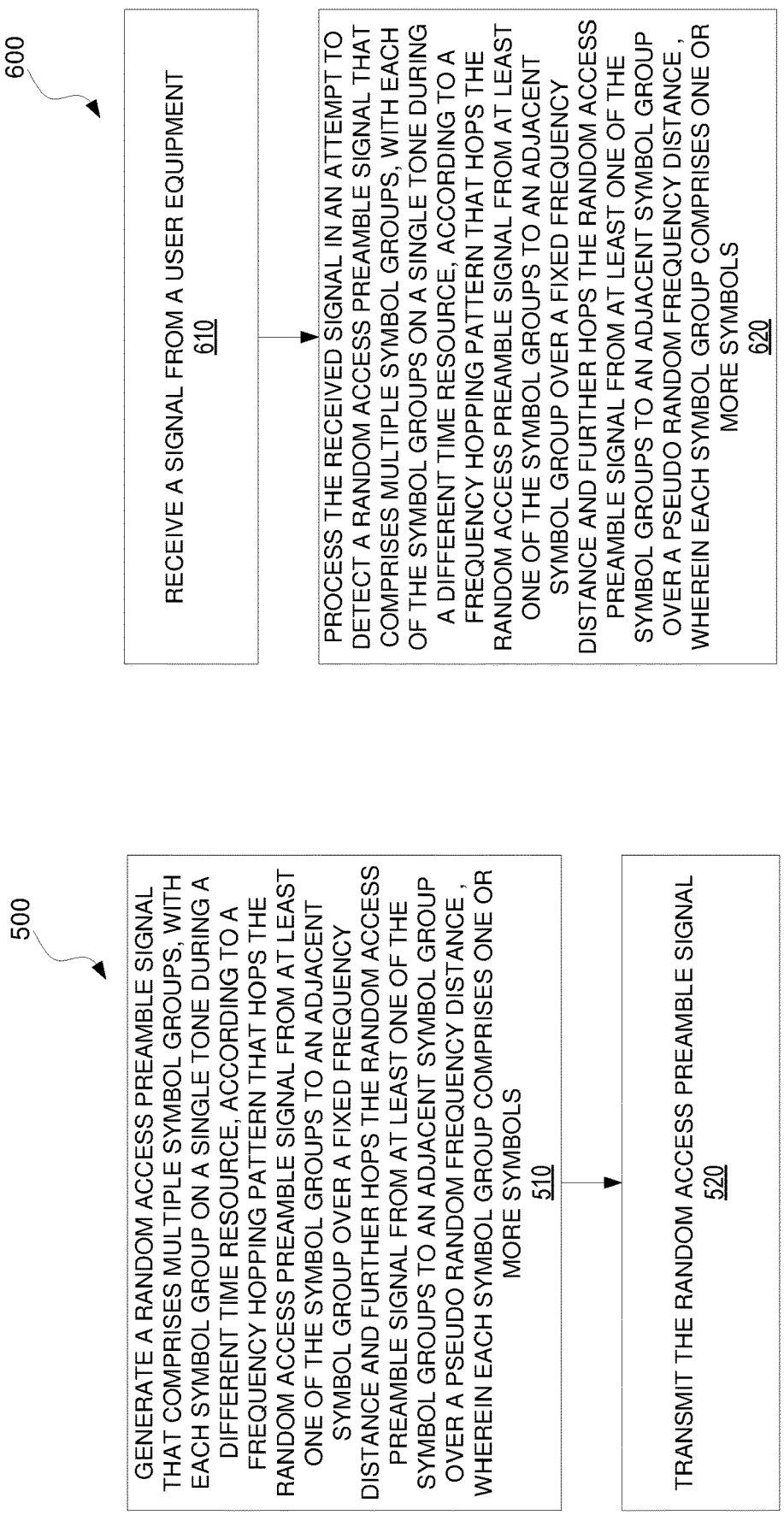

800

RECEIVE CONFIGURATION INFORMATION INDICATING ONE OR MORE PARAMETERS FOR A FREQUENCY HOPPING PATTERN ACCORDING TO WHICH THE WIRELESS COMMUNICATION DEVICE IS TO GENERATE EACH OF THE SYMBOL GROUPS ON A SINGLE TONE DURING A DIFFERENT TIME RESOURCE, WHEREIN THE FREQUENCY HOPPING PATTERN HOPS THE RANDOM ACCESS PREAMBLE SIGNAL FROM AT LEAST ONE OF THE SYMBOL GROUPS TO AN ADJACENT SYMBOL GROUP OVER A FIXED FREQUENCY DISTANCE AND FURTHER HOPS THE RANDOM ACCESS PREAMBLE SIGNAL FROM AT LEAST ONE OF THE SYMBOL GROUPS TO AN ADJACENT SYMBOL GROUP OVER A PSEUDO RANDOM FREQUENCY DISTANCE
810

CONFIGURE THE USER EQUIPMENT TO GENERATE THE RANDOM ACCESS PREAMBLE SIGNAL ACCORDING TO THE RECEIVED CONFIGURATION INFORMATION
820

GENERATE CONFIGURATION INFORMATION INDICATING ONE OR MORE PARAMETERS FOR A FREQUENCY HOPPING PATTERN ACCORDING TO WHICH THE WIRELESS COMMUNICATION DEVICE IS TO GENERATE EACH OF THE SYMBOL GROUPS ON A SINGLE TONE DURING A DIFFERENT TIME RESOURCE, WHEREIN THE FREQUENCY HOPPING PATTERN HOPS THE RANDOM ACCESS PREAMBLE SIGNAL FROM AT LEAST ONE OF THE SYMBOL GROUPS TO AN ADJACENT SYMBOL GROUP OVER A FIXED FREQUENCY DISTANCE AND FURTHER HOPS THE RANDOM ACCESS PREAMBLE SIGNAL FROM AT LEAST ONE OF THE SYMBOL GROUPS TO AN ADJACENT SYMBOL GROUP OVER A PSEUDO RANDOM FREQUENCY DISTANCE
710

TRANSMIT THE CONFIGURATION INFORMATION TO THE USER EQUIPMENT
720

*FIG. 19A*

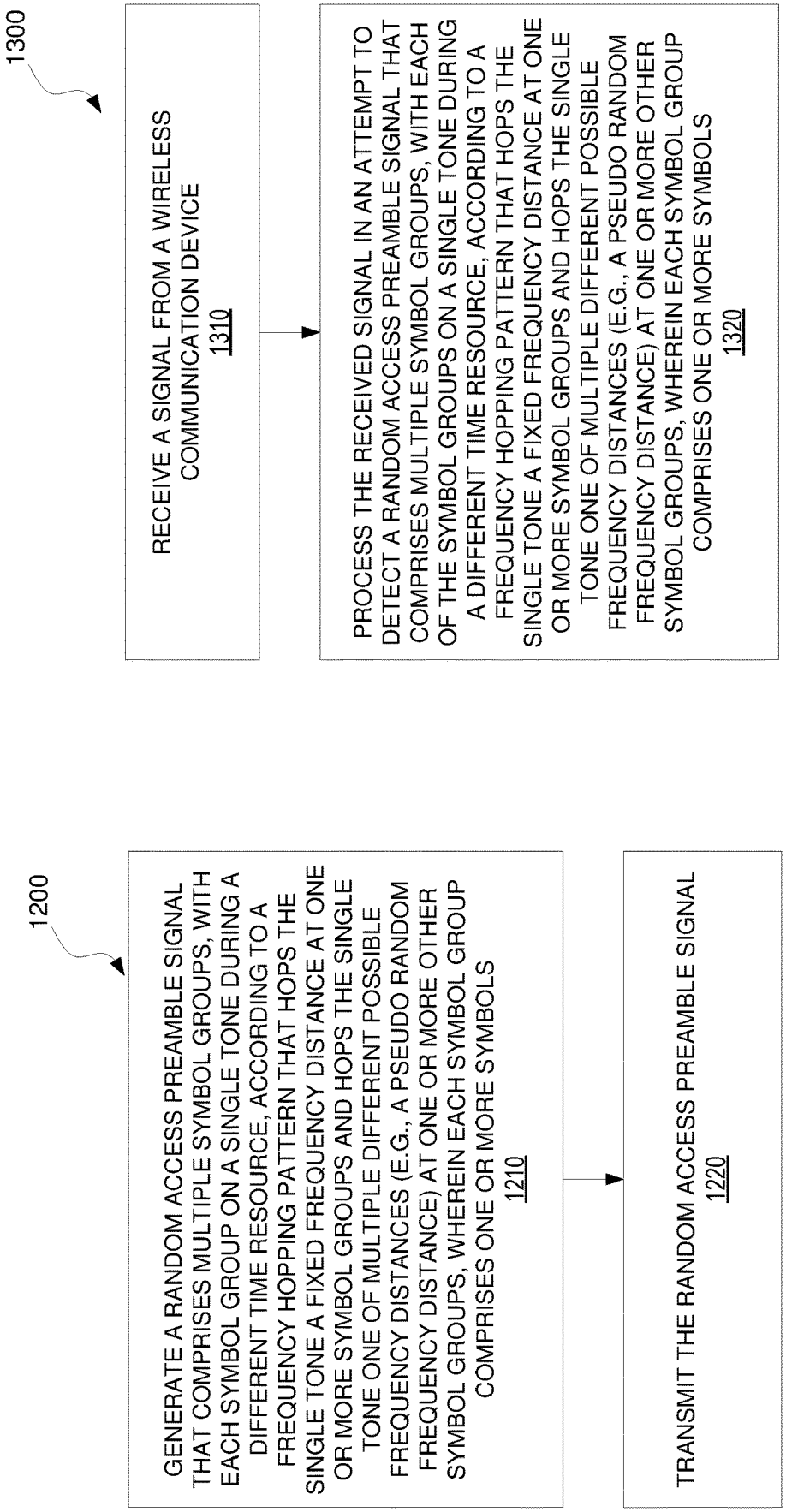

1400

GENERATE CONFIGURATION INFORMATION INDICATING ONE OR MORE PARAMETERS FOR A FREQUENCY HOPPING PATTERN ACCORDING TO WHICH THE WIRELESS COMMUNICATION DEVICE IS TO GENERATE EACH OF THE SYMBOL GROUPS ON A SINGLE TONE DURING A DIFFERENT TIME RESOURCE, WHEREIN THE FREQUENCY HOPPING PATTERN HOPS THE SINGLE TONE A FIXED FREQUENCY DISTANCE AT ONE OR MORE SYMBOL GROUPS AND HOPS THE SINGLE TONE ONE OF MULTIPLE DIFFERENT POSSIBLE FREQUENCY DISTANCES (E.G., A PSEUDO RANDOM FREQUENCY DISTANCE) AT ONE OR MORE OTHER SYMBOL GROUPS
1410

TRANSMIT THE CONFIGURATION INFORMATION TO THE WIRELESS COMMUNICATION DEVICE
1420

RECEIVE CONFIGURATION INFORMATION INDICATING ONE OR MORE PARAMETERS FOR A FREQUENCY HOPPING PATTERN ACCORDING TO WHICH THE WIRELESS COMMUNICATION DEVICE IS TO GENERATE EACH OF THE SYMBOL GROUPS ON A SINGLE TONE DURING A DIFFERENT TIME RESOURCE, WHEREIN THE FREQUENCY HOPPING PATTERN HOPS THE SINGLE TONE A FIXED FREQUENCY DISTANCE AT ONE OR MORE SYMBOL GROUPS AND HOPS THE SINGLE TONE ONE OF MULTIPLE DIFFERENT POSSIBLE FREQUENCY DISTANCES (E.G., A PSEUDO RANDOM FREQUENCY DISTANCE) AT ONE OR MORE OTHER SYMBOL GROUPS
1510

CONFIGURE THE WIRELESS COMMUNICATION DEVICE TO GENERATE THE RANDOM ACCESS PREAMBLE SIGNAL ACCORDING TO THE RECEIVED CONFIGURATION INFORMATION
1520

*FIG. 24B*

FREQUENCY HOPPING FOR RANDOM ACCESS

RELATED APPLICATIONS

This application claims priority to U.S. Provisional patent Application Ser. No. 62/288,436 filed 29 Jan. 2016, and U.S. Provisional patent Application Ser. No. 62/288,633 filed 29 Jan. 2016.

BACKGROUND

The Networked Society and Internet of Things (IoT) are associated with new requirements on cellular networks, e.g. with respect to device cost, battery lifetime and coverage. To drive down device and module cost, using a system-on-a-chip (SoC) solution with integrated power amplifier (PA) is highly desirable. However, it is feasible for the current state-of-the-art PA technology to allow 20-23 dBm transmit power when the PA is integrated to SoC. This constraint limits uplink "coverage", which is related to how much the path loss is allowed between the user terminal and base station. To maximize the coverage achievable by an integrated PA, it is necessary to reduce PA backoff. PA packoff is needed when the communication signal has non-unity peak-to-average power ratio (PAPR). The higher the PAPR is, the higher PA backoff required. Higher PA backoff also gives rise to lower PA efficiency, and thus lower device battery life time. Thus, for wireless IoT and other technologies, designing an uplink communication signal that has as low PAPR as possible is critically important for achieving the performance objectives concerning device cost, battery lifetime and coverage.

3GPP is standardizing Narrowband IoT (NB-IoT) technologies. There is strong support from the existing LTE eco-system (vendors and operators) for evolving existing LTE specifications to include the desired NB IoT features. LTE uplink however is based on single-carrier frequency-division multiple-access (SC-FDMA) modulation for the uplink data and control channels, and Zadoff-Chu signal for random access. Due at least in part to the PAPR properties of these signals, there remains a need for improvement to uplink access.

SUMMARY

A method herein is implemented by a user equipment configured for use in a wireless communication system. The method comprises generating a random access preamble signal that comprises multiple symbol groups, with each symbol group on a single tone during a different time resource, according to a frequency hopping pattern that hops the random access preamble signal a fixed frequency distance at one or more symbol groups and hops the random access preamble signal a pseudo random frequency distance at one or more other symbol groups, wherein each symbol group comprises one or more symbols. The method also comprises transmitting the random access preamble signal.

In some embodiments, the method comprises randomly selecting a single tone on which to transmit a first one of the multiple symbol groups, and selecting the single tones on which to respectively transmit subsequent ones of the multiple symbol groups according to the frequency hopping pattern.

Embodiments herein also include a corresponding method implemented by a radio network node. The method comprises receiving a signal from a wireless communication device (e.g., a user equipment). The method further comprises processing the received signal in an attempt to detect a random access preamble signal that comprises multiple symbol groups, with each of the symbol groups on a single tone during a different time resource, according to a frequency hopping pattern that hops the random access preamble signal a fixed frequency distance at one or more symbol groups and hops the random access preamble signal a pseudo random frequency distance at one or more other symbol groups, wherein each symbol group comprises one or more symbols.

In some embodiments, the method performed by the radio network node further comprises receiving one or more other signals from one or more other user equipments, and processing the one or more other signals in an attempt to detect one or more other random access preamble signals multiplexed in frequency with the random access preamble signal, according to different frequency hopping patterns.

Embodiments further include a method implemented by a network node in a wireless communication system for configuring a user equipment to transmit a random access preamble signal comprising multiple symbol groups, each symbol group comprising one or more symbols. The method comprises generating configuration information indicating one or more parameters for a frequency hopping pattern according to which the user equipment is to generate each of the symbol groups on a single tone during a different time resource. The frequency hopping pattern hops the random access preamble signal a fixed frequency distance at one or more symbol groups and hops the random access preamble signal a pseudo random frequency distance at one or more other symbol groups. The method further comprises transmitting the configuration information to the user equipment.

In some embodiments, the method implemented by the network node further comprises configuring multiple different frequency bands in which random access preamble signals for different types of user equipments are to be transmitted, wherein the different frequency bands have different numbers of tones therein.

Alternatively or additionally for the method implemented by the network node, the configuration information may indicate at least one parameter indicating in which band the user equipment is to transmit a random access preamble signal and/or a number of tones in the band.

In some embodiments, the pseudo random frequency distance is a function of: $f_{hop}(i)=(f_{hop}(i-1)+(\Sigma_{k=i*10+1}^{i*10+9}c(k)*2^{k-(i*10+1)})\mod(N_b^{sc}-1)+1)\mod N_b^{sc}$, wherein $$i = \frac{t}{T},$$

wherein t is a symbol group index, wherein the random access preamble signal hops a pseudo random frequency distance every T symbol groups, wherein $N_b^{sc}$ is a number of tones within which hopping is defined for the random access preamble signal, and c(k) is a pseudo random sequence. In other embodiments, the pseudo random frequency distance is a function of: $f_{hop}(i)=(f_{hop}(i-1)+(\Sigma_{k=i*10+1}^{i*10+9}c(k)*2^{k-(i*10+1)})\mod(N_b^{sc}-1)+1)\mod N_b^{sc}$, wherein $N_b^{sc}$ is a number of tones within which hopping is defined for the random access preamble signal, wherein c(k) is a pseudo random sequence, and wherein i=0, 1, 2, . . . is an index of consecutive pseudo random frequency hops in the frequency hopping pattern. In either or both of these embodiments, the pseudo random sequence c(k) may comprise a sequence of length $M_{PN}$, where $k=0, 1, \ldots, M_{PN}-1$, and is defined by $$c(k)=(x_1(k+N_C)+x_2(k+N_C)) \mod 2$$

$$x_1(k+31)=(x_1(k+3)+x_1(k)) \mod 2$$

$$x_2(k+31)=(x_2(k+3)+x_2(k+2)+x_2(k+1)+x_2(k)) \mod 2$$

where $N_C=1600$, $x_1(0)=1$, $x_1(k)=0$, $k=1, 2, \ldots, 30$, $c_{init}=\Sigma_{i=0}^{30} x_2(i) \cdot 2^i$, and $c_{init}=N_{ID}^{Ncell}$, and $N_{ID}^{cell}=3N_{ID}^{(1)}+N_{ID}^{(2)}$, where $N_{ID}^{cell}$ is a physical-layer cell identity.

In any of the above embodiments, the pseudo random frequency distance may be a function of a cell identity (e.g., a Narrowband physical layer cell identity).

Alternatively or additionally, the fixed frequency distance may comprise a frequency distance of a single tone.

In any of the above embodiments, each symbol group in the random access preamble signal may comprise a cyclic prefix and two or more symbols.

In some embodiments, each symbol group in the random access preamble signal comprises a cyclic prefix and five identical symbols.

In one or more embodiments, the frequency hopping pattern hops the random access preamble signal a fixed frequency distance at each symbol group in a first set of one or more symbol groups, and hops the random access preamble signal a pseudo random frequency distance at each symbol group in a second set of one or more symbol groups different than the first set. In one embodiment, for example, a pseudo random frequency distance hopped at a symbol group in the second set is pseudo randomly selected from candidate frequency distances that include $0, 1, \ldots N_b^{sc}-1$ multiples of a frequency distance spanned by a single tone, wherein $N_b^{sc}$ is a number of tones within which hopping is defined for the random access preamble signal In some embodiments, the frequency hopping pattern hops the random access preamble signal the fixed frequency distance at a symbol group in a direction that depends on a frequency location of the symbol group.

Alternatively or additionally, the frequency hopping pattern hops the random access preamble signal across a bandwidth of a random access channel, such that the multiple symbol groups span the bandwidth of the random access channel.

In any of the above embodiments, each of the different time resources may comprise a single-carrier frequency-division multiple-access (SC-FDMA) symbol group interval. Alternatively or additionally, each of the single tones on which the symbol groups are generated may be a single-carrier frequency-division multiple-access (SC-FDMA) subcarrier.

In some embodiments, the user equipment is a narrowband Internet of Things (NB-IoT) device.

In one or more embodiments, the random access preamble signal is transmitted over a narrowband Physical Random Access Channel, NB-PRACH.

Embodiments herein also include a user equipment for use in a wireless communication system for transmitting a random access preamble signal. The user equipment is configured to generate a random access preamble signal that comprises multiple symbol groups, with each symbol group on a single tone during a different time resource, according to a frequency hopping pattern that hops the random access preamble signal a fixed frequency distance at one or more symbol groups and hops the random access preamble signal a pseudo random frequency distance at one or more other symbol groups. Each symbol group comprises one or more symbols. The user equipment is further configured to transmit the random access preamble signal.

The user equipment may also be configured to perform the method of any of the above mentioned embodiments.

Embodiments further include a radio network node for use in a wireless communication system for receiving a random access preamble signal. The radio network node is configured to receive a signal from a user equipment. The radio network node is further configured to process the received signal in an attempt to detect a random access preamble signal that comprises multiple symbol groups, with each of the symbol groups on a single tone during a different time resource, according to a frequency hopping pattern that hops the random access preamble signal a fixed frequency distance at one or more symbol groups and hops the random access preamble signal a pseudo random frequency distance at one or more other symbol groups, wherein each symbol group comprises one or more symbols.

The radio network node may also be configured to perform the method of any of the above mentioned embodiments.

Embodiments also include a network node for use in a wireless communication system for configuring a user equipment to transmit a random access preamble signal comprising multiple symbol groups, each symbol group comprising one or more symbols. The network node is configured to generate configuration information indicating one or more parameters for a frequency hopping pattern according to which the user equipment is to generate each of the symbol groups on a single tone during a different time resource, wherein the frequency hopping pattern hops the random access preamble signal a fixed frequency distance at one or more symbol groups and hops the random access preamble signal a pseudo random frequency distance at one or more other symbol groups. The network node is also configured to transmit the configuration information to the user equipment.

The network node may also be configured to perform the method of any of the above mentioned embodiments.

Embodiments herein further include a computer program comprising instructions which, when executed by at least one processor of a node, causes the node to perform the method of any of the above embodiments. Embodiments also include a carrier containing this computer program. In this case, the carrier may be one of an electronic signal, optical signal, radio signal, or computer readable storage medium.

According to one or more particular embodiments, a random access preamble signal is a signal is designed for the physical random access channel (PRACH) of NB-IoT. The new PRACH signal is single tone based and has extremely low PAPR, and thus reduces the need for PA backoff to the greatest extent and maximizes PA efficiency. The new PRACH signal is compatible with SC-FDMA and orthogonal frequency-division multiple-access (OFDMA) as in any OFDM symbol interval, the new PRACH signal looks like an OFDM signal of one single subcarrier. Note that for a single subcarrier signal, the OFDM signal is identical to the SC-FDMA signal. Further, hopping patterns are carefully designed such that (1) accurate time-of-arrival estimation can be performed by the base station, (2) the frequency resources can be fully utilized by PRACH while maintaining orthogonality of different preambles.

BRIEF DESCRIPTION OF THE DRAWINGS

FIG. 16A is a logic flow diagram of a method performed by a wireless communication device according to some embodiments.

FIG. 16B is a logic flow diagram of a method performed by a radio network node according to some embodiments.

FIG. 17A is a logic flow diagram of a method performed by a network node according to some embodiments.

FIG. 17B is a logic flow diagram of a method performed by a wireless communication device according to some embodiments.

FIG. 18A is a logic flow diagram of a method performed by a wireless communication device according to other embodiments.

FIG. 18B is a logic flow diagram of a method performed by a radio network node according to other embodiments.

FIG. 19A is a logic flow diagram of a method performed by a network node according to other embodiments.

FIG. 19B is a logic flow diagram of a method performed by a wireless communication device according to other embodiments.

FIG. 23A is a logic flow diagram of a method performed by a wireless communication device according to still other embodiments.

FIG. 23B is a logic flow diagram of a method performed by a radio network node according to still other embodiments.

FIG. 24A is a logic flow diagram of a method performed by a network node according to still other embodiments.

FIG. 24B is a logic flow diagram of a method performed by a wireless communication device according to still other embodiments.

DETAILED DESCRIPTION

Figure 1:
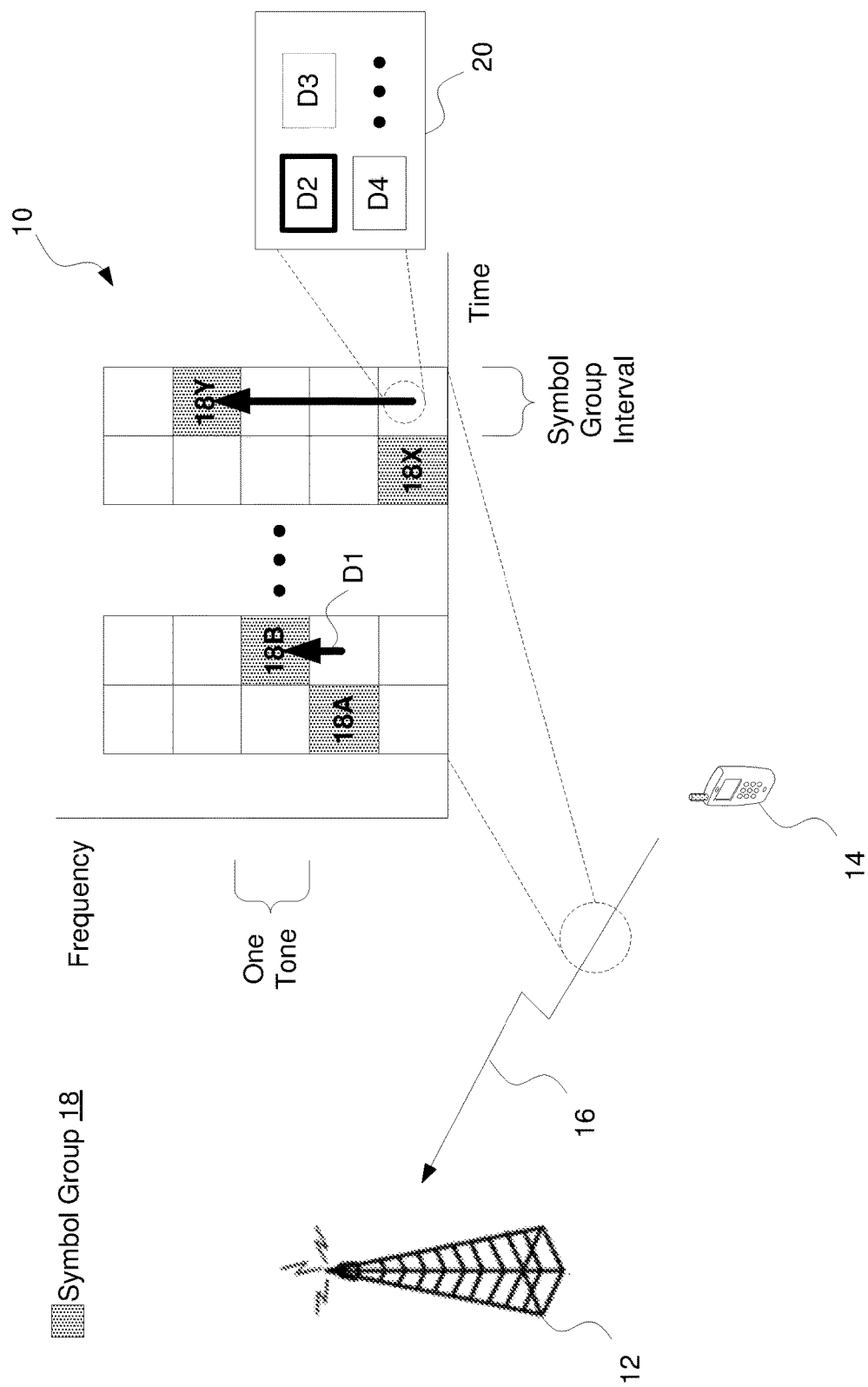
FIG. 1 is a block diagram of a wireless communication system that includes a wireless communication device and a radio network node according to one or more embodiments.

FIG. 1 illustrates a wireless communication system 10 (e.g., a narrowband IoT, NB-IoT, system) according to one or more embodiments. The system 10 includes a radio network node 12 (e.g., an eNB) and a wireless communication device 14 (e.g., a user equipment, which may be a NB-IoT device). The device 14 is configured to perform random access, e.g., for initial access when establishing a radio link, for transmitting a scheduling request, and/or for achieving uplink synchronization. Regardless of the particular objective achieved by this random access, the device 14 generates a random access preamble signal 16 to transmit to the radio network node 12 as part of random access. Where the system 10 is a NB-IoT system, for instance, the device 14 may transmit the random access preamble signal over a narrowband physical random access channel (NB-PRACH).

The device 14 in this regard generates a random access preamble signal 16 that comprises multiple symbol groups 18 (e.g., L number of groups). These multiple symbol groups 18 are shown for example as groups 18A, 18B . . . 18X, 18Y. Each symbol group 18 comprises one or more symbols (e.g., a cyclic prefix and a sequence of five identical symbols). Moreover, the device 14 generates the random access preamble signal 16 so that each symbol group 18 occurs during a different time resource (e.g., symbol group interval, such as an OFDM or SC-FDMA symbol interval). FIG. 1 shows that the device 14 may generate the random access signal 16 in this way by concatenating the multiple symbol groups 18 in time, e.g., in a serial or consecutive fashion without overlap.

The device 14 generates the random access preamble signal 16 with each group 18 on a single tone (e.g., a subcarrier, such as an OFDM or SC-FDMA subcarrier). That is, each group 18 during any given time resource spans only a single tone in frequency. The groups 18 however are not all on the same tone. Instead, the device 14 generates the random access preamble signal 16 according to a frequency hopping pattern that hops the random access preamble signal transmission from tone to tone. That is, the frequency hopping pattern governs on which single tone each symbol group 18 will occur on, during its respective time resource, so as to effectively hop the single tone on which the symbol groups 18 occur on in frequency.

Note though that in at least some embodiments the frequency hopping pattern governs on which single tone symbol groups 18 after the first symbol group will occur on. In one embodiment, for instance, the single tone on which the first symbol group occurs is randomly selected (e.g., from those tones in the signal's transmission bandwidth), and the single tones on which subsequent ones of the symbol groups respectively occur is selected according to (i.e., governed by) the frequency hopping pattern.

Notably, the frequency hopping pattern hops the random access preamble signal 16 a fixed frequency distance at one or more symbol groups 18 and hops the random access preamble signal 16 one of multiple different possible frequency distances at one or more other symbol groups 18. The pattern may for instance hop the signal from one of the symbol groups to an adjacent symbol group over a fixed frequency distance, and hop the signal from another of the symbol groups to an adjacent symbol group over a pseudo random frequency distance. With each symbol group 18 occurring on a single tone during a respective time resource, the frequency hopping pattern may also be characterized as hopping the random access preamble signal 16 a fixed frequency distance at one or more time resources and hopping the random access preamble signal 16 one of multiple different possible frequency distances at one or more other time resources.

As shown in FIG. 1, for example, at symbol group 18B (or its respective time resource), the pattern hops the random access preamble signal 16 a fixed frequency distance D1, such that the symbol group 18B occurs on a single tone that is a fixed frequency distance D1 away from the single tone on which the previous symbol group 18A occurred. This fixed frequency distance D1 is illustrated as the frequency distance of a single tone, since the previous symbol group 18A occurred on an adjacent tone. By contrast, at symbol group 18Y (or its respective time resource), the pattern hops the random access preamble signal 16 one of multiple different possible frequency distances 20 (which may for instance be pseudo randomly generated or selected), such that the symbol group 18Y occurs on a single tone that is one of multiple different possible frequency distances 20 away from the single tone on which the previous symbol group 18X occurred. In some embodiments, therefore, the pattern hops the random access preamble signal 16 at some symbol groups by a fixed distance, but hops the random access preamble signal 16 at other symbol groups by a variable or pseudo random distance. In any event, FIG. 1 shows these possible distances 20 as including frequency distances D2, D3, and D4, although other examples with two or more possible distances 20 are of contemplated. Regardless, FIG. 1 illustrates as an example that the hopping pattern hops the random access preamble signal 16 a frequency distance D2 at symbol group 18Y (relative to the single tone on which symbol group 18X occurred). This frequency distance D2 may differ from frequency distance D1, especially if the multiple different possible frequency distances 20 do not include distance D1. In this case, therefore, the pattern hops the random access preamble signal 16 different frequency distances D1, D2 at different symbol groups 18B, 18Y.

In one or more embodiments, as alluded to above, the multiple different possible frequency distances 20 include those frequency distances 20 which may be pseudo randomly selected or generated, e.g., according to a defined rule or formula. In this case, then, the frequency hopping pattern hops the random access preamble signal 16 a fixed frequency distance at one or more symbol groups 18 and hops the random access preamble signal 16 a pseudo random frequency distance at one or more other symbol groups 18. The pattern may for instance hop the random access preamble signal 16 from one of the symbol groups to an adjacent symbol group over a fixed frequency distance, and hop the random access preamble signal 16 from another of the symbol groups to an adjacent symbol group over a pseudo random frequency distance. Accordingly, frequency distance D1 in FIG. 1 may be a fixed frequency distance whereas frequency distance D2 may be a pseudo random frequency distance.

In at least some embodiments, the fixed frequency distance D1 is less than or equal to a frequency distance threshold associated with a certain objective. At least one of the multiple different possible frequency distances 20 is greater than this frequency distance threshold. Where the multiple different possible frequency distances 20 are pseudo random frequency distances, for instance, this means the range of frequency distances which may be pseudo randomly selected or generated includes at least one frequency distance greater than the frequency distance threshold. This frequency distance threshold may be for instance the distance spanned by one or two tones.

In some embodiments, for example, this objective is a targeted cell size and/or a targeted time-of-arrival estimation range, e.g., for uplink synchronization purposes. In this case, the frequency distance threshold may be set to not only achieve this objective, but also to achieve a target timing estimation accuracy.

More particularly in this regard, the phase difference of two adjacent received symbol groups caused by hopping is prone to a 2*Pi phase ambiguity, which may cause confusion in the time-of-arrival estimation. A large hopping distance D may be chosen in an effort to avoid the 2*Pi phase ambiguity. But this would come at the cost of reducing the time-of-arrival estimation range, and in turn reducing the cell size that can be supported. Therefore, a small frequency hopping distance may be used to ensure a certain cell size can be supported. For example, with 35 km cell size and 3.75 kHz subcarrier spacing, there should be some hopping by at most one tone.

On the other hand, the phase difference of two adjacent received symbol groups due to hopping is proportional to the hopping distance D. This means that choosing a large hopping distance D makes the observed phase difference more robust to noise, which in turn helps improve time-of-arrival estimation performance. Effectively, then, timing estimation accuracy is inversely proportional to the signal bandwidth or transmission bandwidth of the random access preamble signal 14. That is, spreading the signal over a wider bandwidth achieves better timing estimation accuracy. This means that, when pseudo random hopping is used, the wider the pseudo random hopping range, the narrower the correlation peak for time-of-arrival estimation, and thus the more accurate the estimation.

Achievement of both a target time-of-arrival estimation range and a target timing estimation accuracy is therefore accomplished in some embodiments by employing a frequency hopping pattern that sometimes hops with a frequency distance which is small enough to achieve a targeted estimation range and that at other times hops with a frequency distance which is large enough to achieve a targeted estimation accuracy. In other words, multiple frequency distances (i.e., multiple levels or sizes) for frequency hopping are used (e.g., additional hopping is used on top of the first level fixed size hopping). Multiple frequency distances are used, though, with the constraint that there should be some hopping distances small enough to allow sufficient time-of-arrival estimation range (equivalently, to support a target cell size).

Alternatively or additionally, the frequency hopping pattern in FIG. 1 hops the random access preamble signal 16 a fixed frequency distance at each symbol group in a first set of one or more symbol groups, and hops the random access preamble signal 16 one of multiple different possible frequency distances at each symbol group in a second set of one or more symbol groups different than the first set. The first and second sets in this regard may be interlaced in time and non-overlapping, with both sets including every other symbol group. The multiple different possible frequency distances may be for instance pseudo-randomly generated or selected. Regardless, the fixed frequency distance may be set to achieve a defined objective as described above (e.g., required a small frequency distance), whereas the multiple different possible frequency distances may be established to hop the random access preamble signal 16 across all or substantially all of the signal bandwidth (e.g., to improve timing estimation accuracy).

In these or other embodiments, the frequency hopping pattern may be generated as a combination of two hopping patterns; namely, a fixed distance hopping pattern and a multi-distance hopping pattern. The fixed distance hopping pattern hops the random access preamble signal 16 a fixed frequency distance at each symbol group in a first set of one or more symbol groups. The multi-distance hopping pattern hops the random access preamble signal 16 one of multiple different possible frequency distances at each symbol group in a second set of one or more symbol groups different than the first set. This multi-distance hopping pattern may be a pseudo-random hopping pattern.

Figure 2:
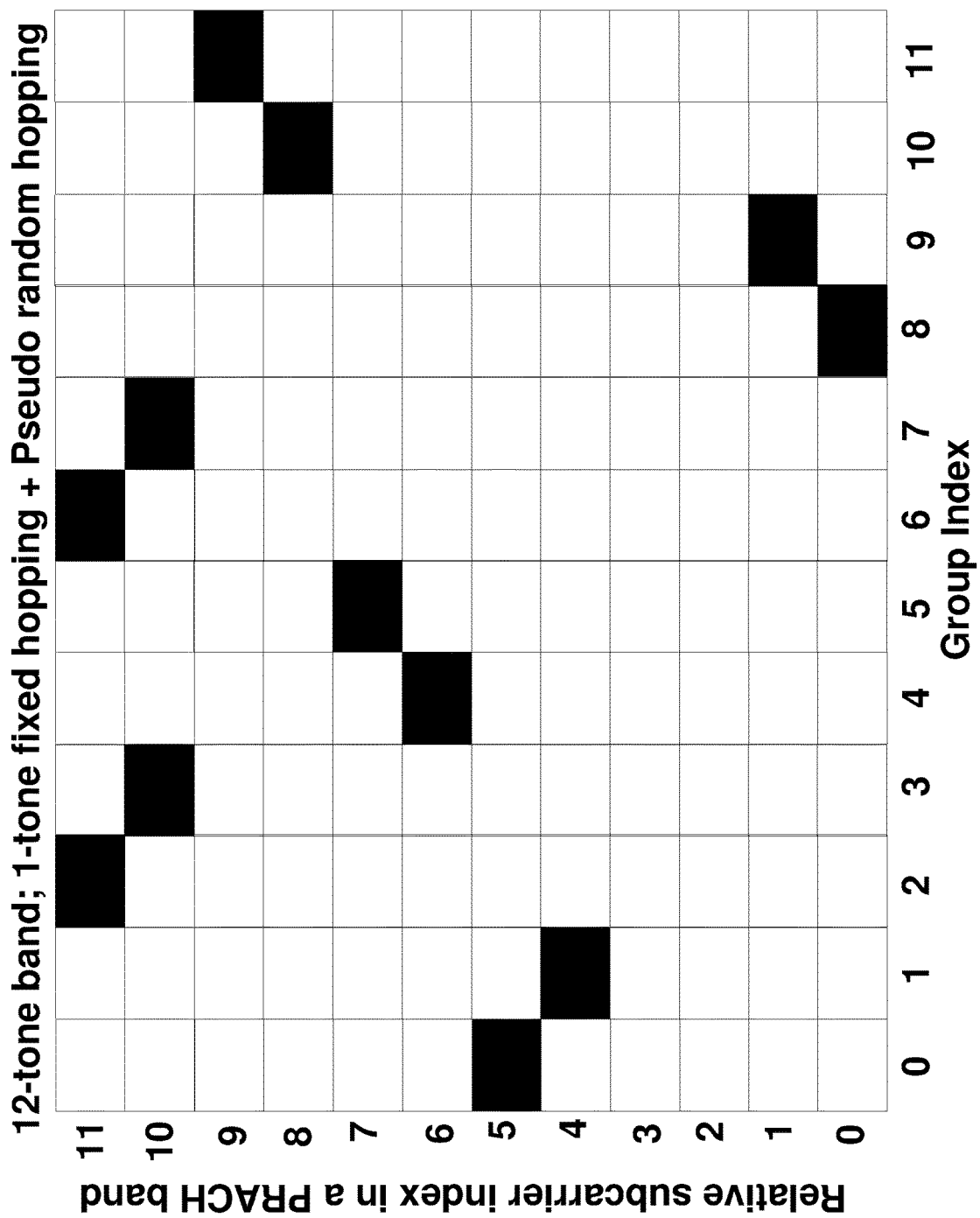
FIG. 2 is a block diagram illustrating an example of a frequency hopping pattern according to one or more embodiments.

FIG. 2 illustrates one example where a frequency distance hopped at a symbol group in the second set is selected from candidate frequency distances that include 0, 1, . . . and $N_b^{sc}-1$ multiples of a frequency distance spanned by a single tone, where $N_b^{sc}$ is a number of tones in a transmission bandwidth of the random access preamble signal and/or a number of tones within which hopping is defined for the random access preamble signal 16. FIG. 2 illustrates this example in an LTE or NB-IoT context where the signal is transmitted over a narrowband physical random access channel, NB-PRACH, with $N_b^{sc}=12$. The symbol groups in FIG. 2 are consecutively indexed in time via an index t. This symbol group index t may be referred to as a PRACH group index.

In FIG. 2, at each even PRACH group index t, i.e., 0, 2, 4, . . . , the hopping is pseudo random and can be any value in the PRACH band (i.e., any value between 0 and 11, with $N_b^{sc}=12$). At each odd PRACH group index t, the hopping is a fixed size hopping (e.g., 1 tone) relative to the tone used at the PRACH group index t−1. Accordingly, every $N_{sb}^{sc}=2n_{micro}$ tones in a PRACH band may be called a PRACH subband, where $n_{micro}$ denotes the size of the fixed hopping. For example, in FIG. 2, the size of fixed hopping is 1, and every $N_{sb}^{sc}=2$ tones in the PRACH band constitute a PRACH subband. The PRACH band thereby consists of multiple different subbands, with each subband being a subset of the PRACH band in which the random access preamble signal is hopped by a fixed frequency distance. In other embodiments not shown where the size of the fixed hopping is 2 tones, every $N_{sb}^{sc}=2*2=4$ tones in the PRACH band constitute a PRACH subband. Therefore, the number $N_b^{sc}$ of tones in a PRACH band should be divisible by $N_{sb}^{sc}$ to fully use all the frequency resources.

At least some embodiments fully utilize the frequency resources for PRACH, by hopping the random access preamble signal 16 across the PRACH's bandwidth, e.g., such that the symbol groups 18 span the PRACH's bandwidth. According to the embodiment shown in FIG. 2, for instance, the fixed size hopping at a particular odd group index can be either "Upward" or "Downward," while the hopping at an even index is pseudo random. For a PRACH transmission located in a PRACH subband, if the transmission uses a tone in the lower half of the subband at an even group index t, the transmission will jump "Upward" at group index t+1. If the transmission uses a tone in the upper half of the subband at an even group index t, the transmission will jump "Downward" at group index t+1. In this and other embodiments, therefore, the frequency hopping pattern hops the random access preamble signal 16 the fixed frequency distance at a symbol group in a direction that depends on a frequency location of the symbol group.

Figure 3:
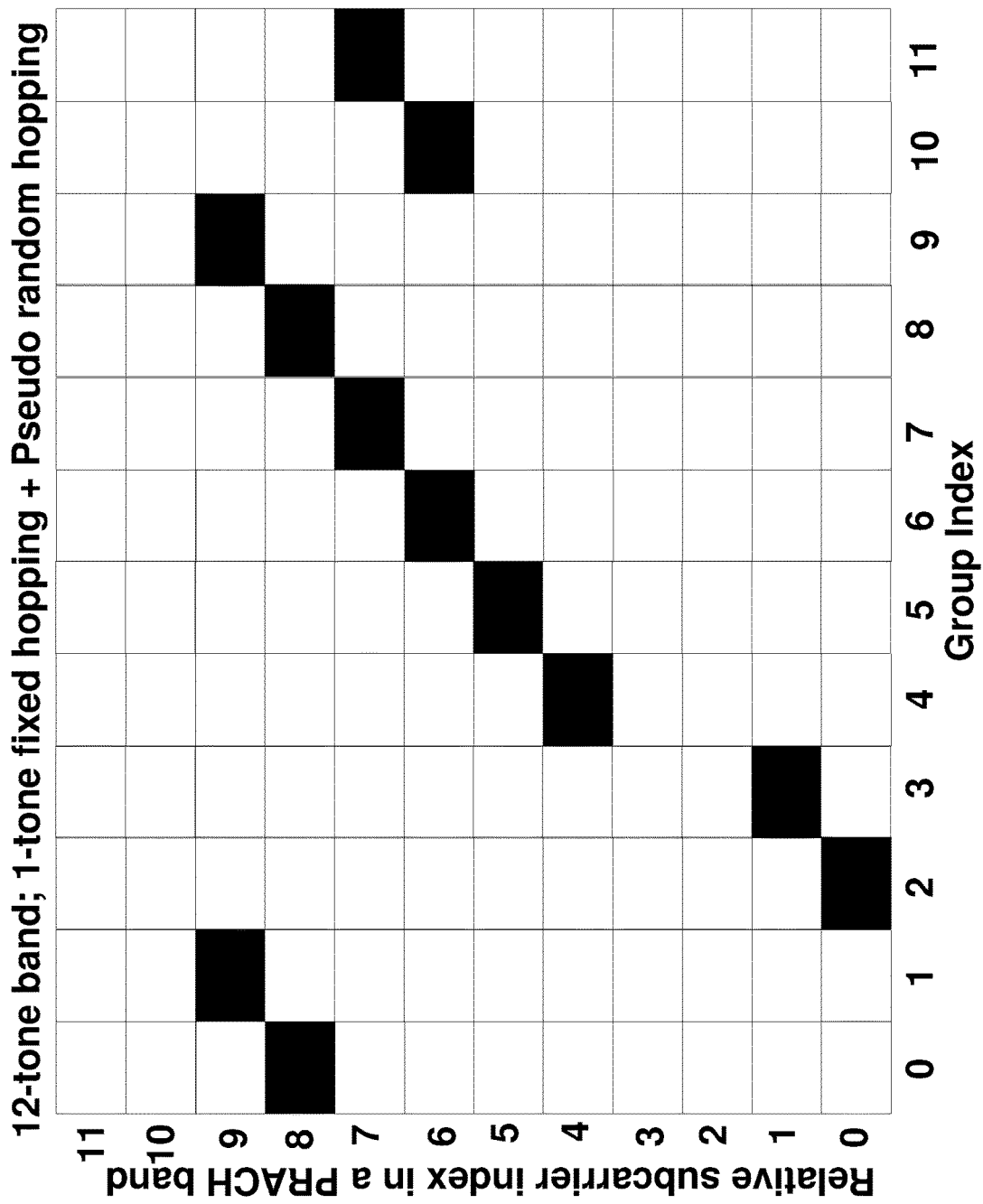
FIG. 3 is a block diagram illustrating an example of a frequency hopping pattern according to one or more other embodiments.

FIG. 3 illustrates a different example where instead a frequency distance hopped at a symbol group in the second set is selected from candidate frequency distances that include 0, $N_{sb}^{sc}$, $2N_{sb}^{sc}$, . . . , and $N_b^{sc}-N_{sb}^{sc}$ multiples of a frequency distance spanned by a single tone, wherein $N_b^{sc}$ is a number of tones in a transmission bandwidth of the random access preamble signal, and wherein $N_{sb}^{sc}$ is a number of tones in any given subband. FIG. 3 again illustrates this example in an LTE or NB-IoT context where the signal is transmitted over the PRACH, with $N_b^{sc}=12$ and $N_{sb}^{sc}=2$.

In FIG. 3, at each even PRACH group index, i.e., 0, 2, 4, . . . , the hopping is pseudo random in a subset of tones in the PRACH band. At each odd PRACH group index t, the hopping is a fixed size hopping relative to the tone used at the PRACH group index t−1. The fixed size hopping is always "Upward" or always "Downward". In FIG. 3, the size of fixed hopping is 1.

Note the differences of the hopping pattern in FIG. 3 from the hopping pattern in FIG. 2. The pseudo random hopping pattern in FIG. 3 is PRACH subband based, while the pseudo random hopping in FIG. 1 is tone based. In other words, the possible sizes of pseudo random hopping in FIG. 2 can be 0, 1, 2, . . . , $N_b^{sc}-1$, while the possible sizes of pseudo random hopping in FIG. 3 can only be 0, $N_{sb}^{sc}$, $2N_{sb}^{sc}$, . . . , $N_b^{sc}-N_{sb}^{sc}$. Again it is assumed that number $N_b^{sc}$ of tones in a PRACH band is divisible by $N_{sb}^{sc}$. Further, for a particular PRACH transmission, with the hopping pattern illustrated in FIG. 3 the fixed size hopping is always either "Upward" or "Downward" during the transmission, while the hopping pattern illustrated in FIG. 2 the fixed size hopping may change between "Upward" and "Downward." These differences can be seen in FIGS. 2 and 3.

Since each PRACH preamble effectively only uses one tone during any given time resource, different preambles can be multiplexed in the frequency domain. In some embodiments, therefore, the radio network node 12 is configured to receive one or more other signals from one or more other user equipments, and process those one or more other signals in an attempt to detect one or more other random access preamble signals multiplexed in frequency with the random access preamble signal 16, according to different frequency hopping patterns.

Figure 4:
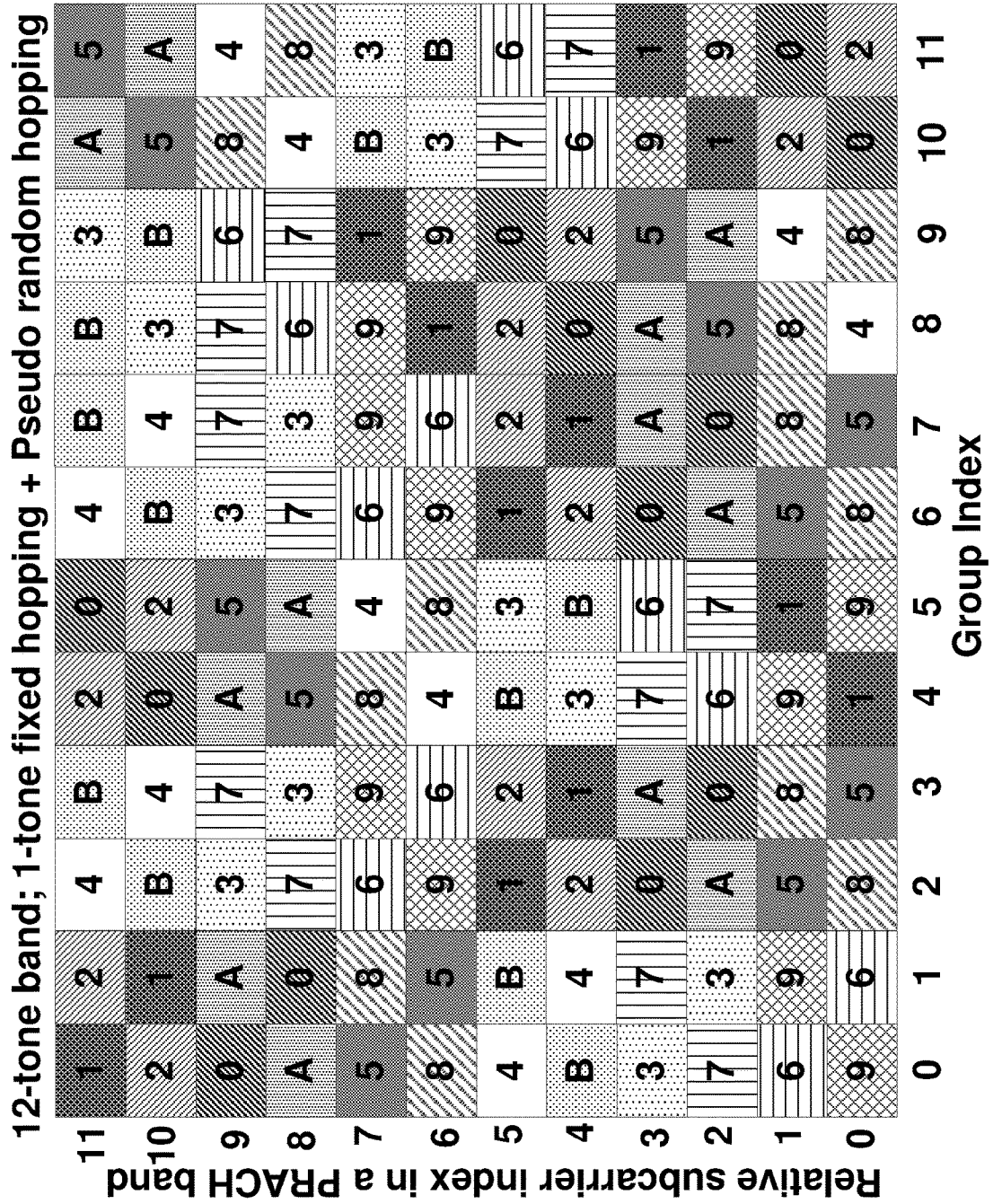
FIG. 4 is a block diagram illustrating an example of multiplexing of frequency hopping patterns within an 12-tone band, according to one or more embodiments.
Figure 5:
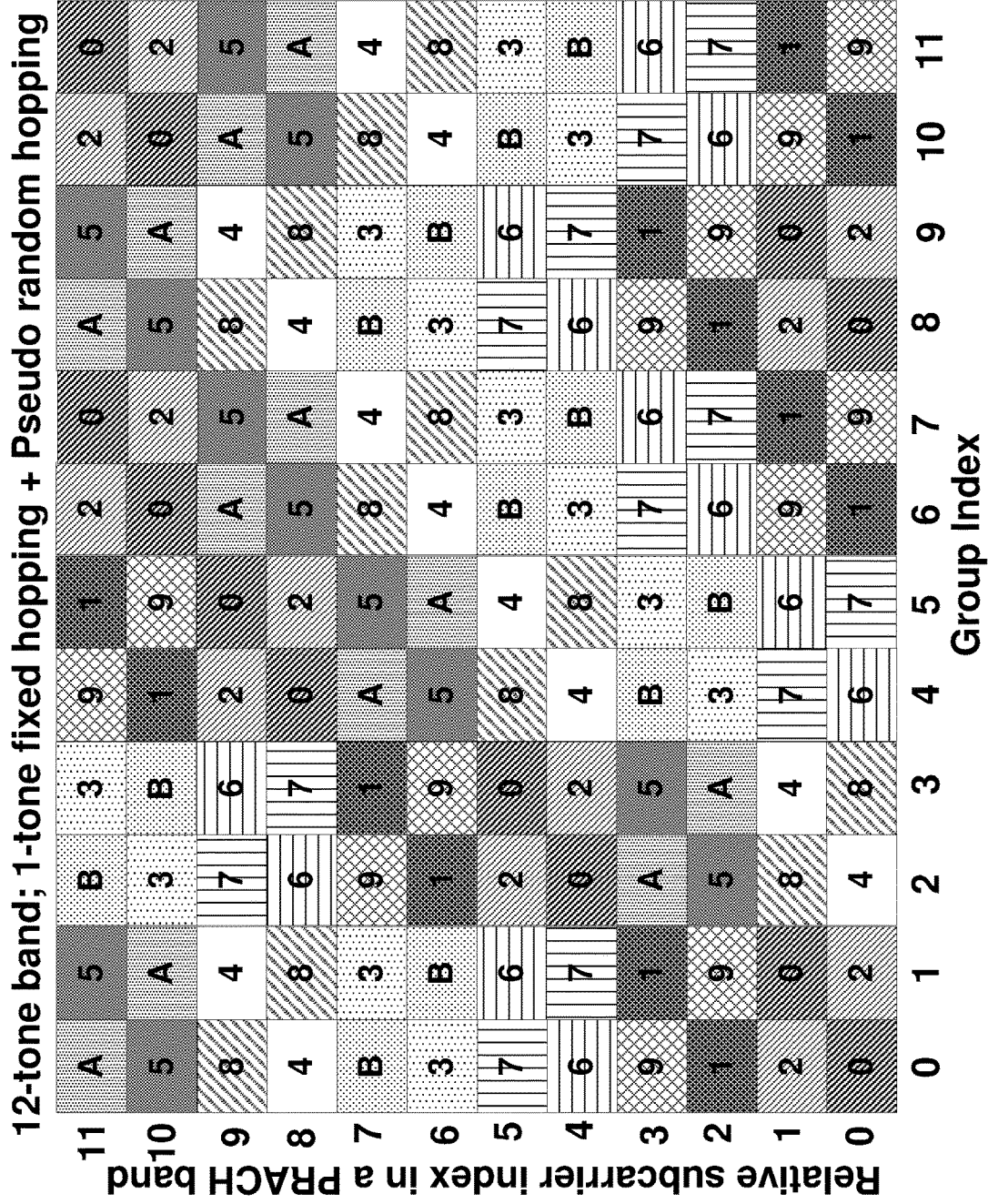
FIG. 5 is a block diagram illustrating an example of multiplexing of frequency hopping patterns within an 12-tone band, according to one or more other embodiments.

The hopping patterns are designed in some embodiments such that the frequency resources can be fully utilized by PRACH. For example, FIG. 4 shows the multiplexing of 12 PRACH frequency hopping patterns, corresponding to the hopping pattern illustrated in FIG. 2. Each fill pattern (or reference number/letter) represents one frequency hopping pattern. FIG. 5 shows the multiplexing of 12 PRACH frequency hopping patterns, corresponding to the hopping pattern illustrated in FIG. 3. In general, N tones can be configured for multiplexing N PRACH frequency hopping patterns. Each PRACH hopping pattern uses one tone during one OFDM symbol group interval, and the hopping patterns according to embodiments herein (as shown in FIGS. 4 and 5) ensure no two hopping patterns use the same tone during the same OFDM symbol group interval.

According to some embodiments, the detailed formulas for the hopping pattern illustrated in FIGS. 2 and 4 are given as follows.

$$\widetilde{n_{sc}}(t) = n_{start} + (n_{sc} + f_{hop}(i)) \bmod N_b^{sc}, \; i = \frac{t}{2}, \; t = 0, 2, 4, \ldots$$

$$\widetilde{n_{sc}}(t) = \widetilde{n_{sc}}(t-1) + \left(1 - 2 * \left\lfloor \frac{\widetilde{n_{sc}}(t-1) \bmod (2n_{micro})}{n_{micro}} \right\rfloor \right) * n_{micro},$$

$$t = 1, 3, 5, \ldots$$

$$f_{hop}(i) =$$

$$\left(f_{hop}(i-1) + \left(\sum_{k=i*10+1}^{i*10+9} c(k) * 2^{k-(i*10+1)}\right) \bmod (N_b^{sc} - 1) + 1\right) \bmod N_b^{sc}$$

Here, $n_{start}$ denotes the starting index of the PRACH band, $n_{sc}$ is the relative tone index in the PRACH band (relative to $n_{start}$), $n_{micro}$ is the size of the fixed hopping, $N_b^{sc}$ is the number of tones in a transmission bandwidth of the random access preamble signal, $f_{hop}(-1)=0$. An example of the pseudo-random sequence $c(k)$ can be the one given by clause 7.2 in 3GPP TS 36.211 v13.0.0. In particular, the pseudo random sequence $c(k)$ comprises a sequence of length $M_{PN}$, where $k=0, 1, \ldots M_{PN}-1$, and is defined by $$c(k)=(x_1(k+N_C)+x_2(k+N_C)) \bmod 2$$

$$x_1(k+31)=(x_1(k+3)+x_1(k)) \bmod 2$$

$$x_2(k+31)=(x_2(k+3)+x_2(k+2)+x_2(k+1)+x_2(k)) \bmod 2$$

where $N_C=1600$, $x_1(0)=1$, $x_1(k)=0$, $k=1, 2, \ldots, 30$, $c_{init}=\sum_{i=0}^{30} x_2(i) \cdot 2^i$, and $c_{init}=N_{ID}^{Ncell}$, if cell-specific hopping is desired. $N_{ID}^{cell}$ is a physical-layer cell identity.

As this example demonstrates, therefore, the pseudo-random sequence generator can be cell specific if needed. For example, the pseudo-random sequence $c(k)$ given by clause 7.2 in 36.211 can be initialized with cell ID if desired.

In this and other embodiments where hopping is cell specific, pseudo random hopping may be viewed as a type of cell specific code division multiplexing (CDM). This CDM allows neighboring cells to use the same frequency resources for NB-PRACH. This in turn greatly increases NB-PRACH capacity, compared to FDM of NB-PRACH among neighboring cells. Specifically, with 180 kHz bandwidth and 3.75 kHz subcarrier spacing, up to 48 NB-PRACH preambles can be used in a cell.

The detailed formulas for the hopping pattern illustrated in FIGS. 3 and 5 are given as follows.

$$\widetilde{n_{sc}}(t) = n_{start} + \left(n_{sc} + f_{hop}(i) * \frac{N_b^{sc}}{2n_{micro}}\right) \bmod N_b^{sc}, \; i = \frac{t}{2}, \; t = 0, 2, 4, \ldots$$

$$\widetilde{n_{sc}}(t) = \widetilde{n_{sc}}(t-1) + \left(1 - 2 * \left\lfloor \frac{n_{sc} \bmod (2n_{micro})}{n_{micro}} \right\rfloor \right) * n_{micro}, \; t = 1, 3, 5, \ldots$$

$$f_{hop}(i) = \left(f_{hop}(i-1) + \left(\sum_{k=i*10+1}^{i*10+9} c(k) * 2^{k-(i*10+1)}\right) \bmod \left(\frac{N_b^{sc}}{2n_{micro}} - 1\right) + 1\right)$$

$$\bmod \frac{N_b^{sc}}{2n_{micro}}$$

Here $n_{start}$ denotes the starting index of the PRACH band, $n_{sc}$ is the relative tone index in the PRACH band (relative to $n_{start}$), $n_{micro}$ is the size of the fixed hopping $N_b^{sc}$ is the number of tones in a transmission bandwidth of the random access preamble signal, $f_{hop}(-1)=0$. An example of the pseudo-random sequence $c(k)$ can be the one given by clause 7.2 in 36.211 v13.0.0, as detailed above. And, again, the pseudo-random sequence generator can be cell specific if needed. For example, the pseudo-random sequence $c(k)$ given by clause 7.2 in 36.211 can be initialized with cell ID if desired.

Note that the above are just two examples of possible hopping patterns. Any hopping patterns that use both fixed size hopping and additional multi-level hopping may be employed by certain embodiments herein. The multi-level hopping constitutes any hopping where the size hopped at any given symbol group (or time resource) is one of multiple different frequency distances defined as possible for that hopping. Multi-level hopping can be achieved by (but not limited to), for example, pseudo random hopping, as illustrated in the above examples. Specifically, the pseudo random hopping may be equivalently considered as hopping where the size hopped at any given symbol group (or time resource) may be one of multiple predetermined hopping sizes (which are determined in advance by specified pseudo random formulas). The fixed size hopping includes both "Upward" and "Downward" hopping to fully utilize frequency resource. The fixed size hopping ensures the targeting time-of-arrival estimation range can be met by PRACH. The additional multi-level hopping (achieved for example via pseudo random hopping) greatly improves the time-of-arrival estimation accuracy.

Figure 6:
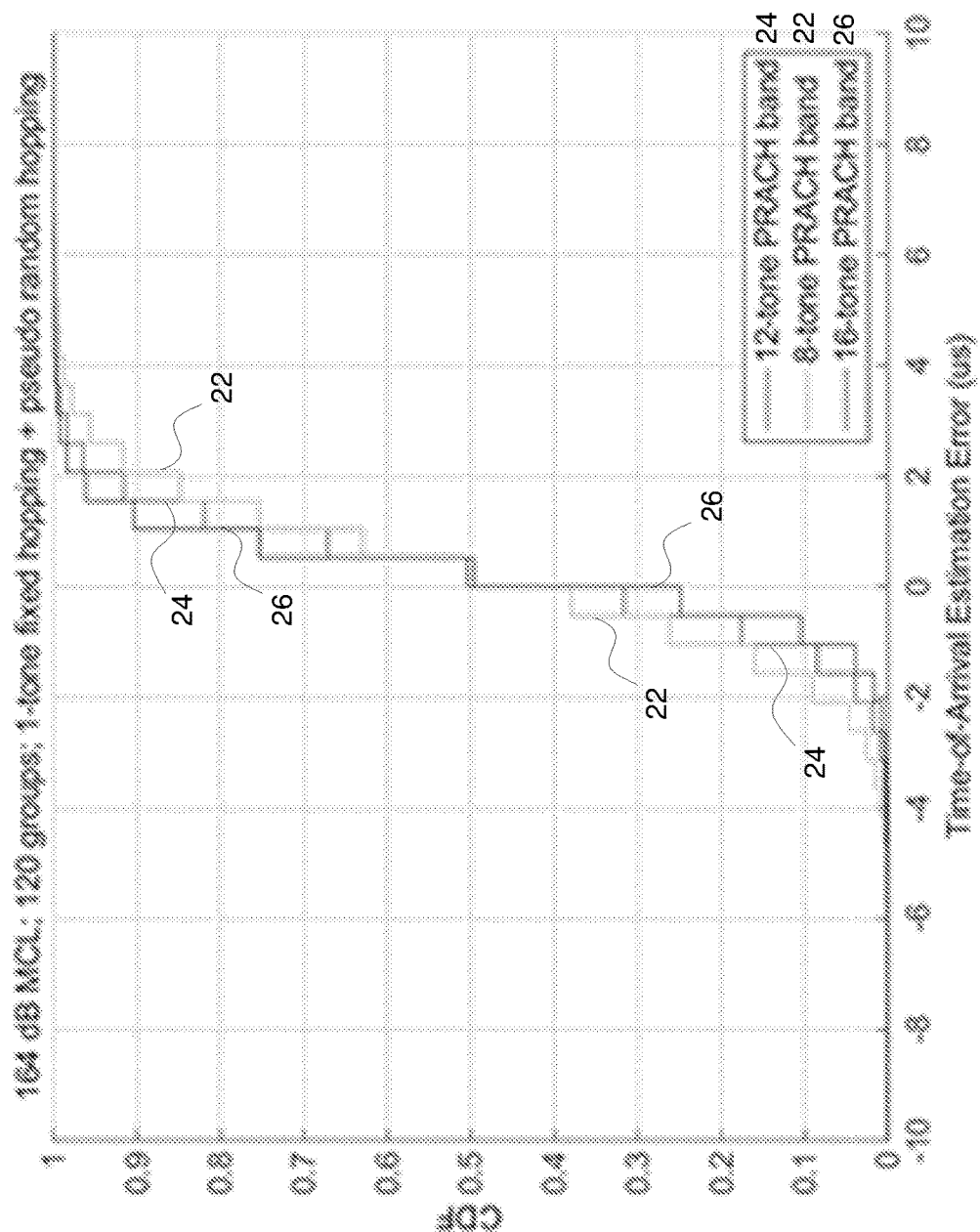
FIG. 6 is a line graph illustrating performance of time-of-arrival estimation for random access preamble signals with different transmission bandwidths according to some embodiments.

Indeed, FIG. 6 shows that the hopping patterns according to some embodiments can help the base station obtain very accurate time of arrival estimation accuracy even if the preamble transmission only uses one single tone of 3.75 kHz at a time. FIG. 6 in this regard shows this for PRACH bands that include different numbers of tones, including an 8-tone PRACH band 22, a 12-tone PRACH band 24, and a 16-tone PRACH band 26.

In some embodiments, each base station configures one or more PRACH bands, e.g., for different types of user equipments. The number of tones in each band can be different. For example, if frequency division multiplexing of PRACH transmissions of different coverage classes is allowed, a base station may configure PRACH bands of different bandwidths for different coverage classes. A larger band may be used for longer preambles. The PRACH bands of neighboring cells may or may not overlap. In case of overlapping, cell-specific pseudo random hopping may be used to distinguish preambles in neighboring cells and/or to mitigate inter-cell interference. Each band may for instance be characterized by a starting tone index $n_{start}$, and the number of tones in the transmission bandwidth of the random access preamble signal $N_b^{sc}$ (or the ending tone index). Each band may also be characterized by the size of the fixed hopping $n_{micro}$.

Figure 7:
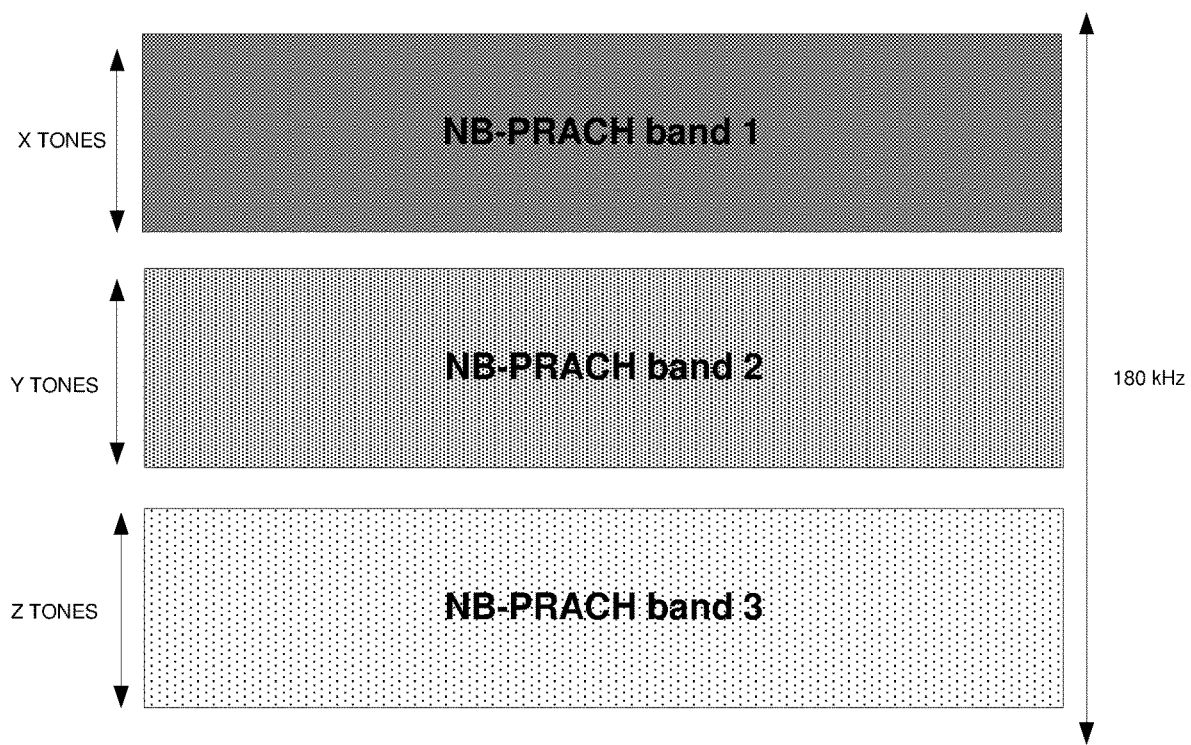
FIG. 7 is a block diagram illustrating configuration of multiple different random access channel bands with different numbers of tones according to one or more embodiments.

In any event, an illustration of a possible NB-PRACH configuration of a base station is given in FIG. 7. As shown, the base station configures a first NB-PRACH band 1 which includes X number of tones, a second NB-PRACH band 2 which includes Y number of tones, and a third NB-PRACH band 3 which includes Z number of tones. These three bands are all configured within the 180 kHz bandwidth of a narrowband carrier (e.g., 1 physical resource block).

For contention based random access with one or more NB-PRACH bands configured, the device 14 in some embodiments first randomly selects a tone in the configured PRACH frequency resource pool that may include one or more PRACH bands. The device 14 may for instance randomly select a single tone from among the tones included in the one or more PRACH bands configured. The device 14 then transmits the random access preamble signal 16 in the corresponding PRACH band according to a frequency hopping pattern as described above.

Figure 8:
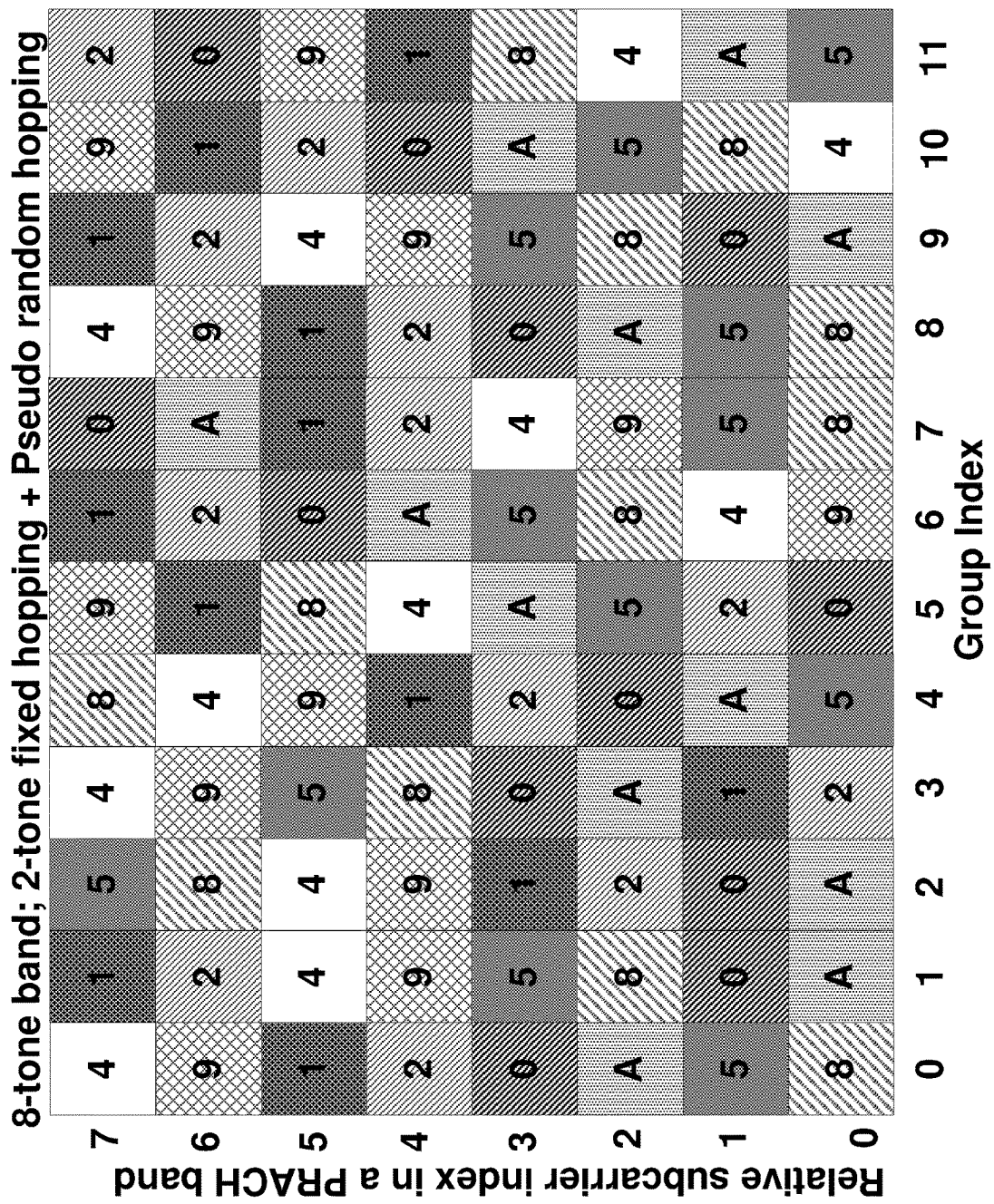
FIG. 8 is a block diagram illustrating an example of multiplexing of frequency hopping patterns within an 8-tone band, according to one or more embodiments.
Figure 9:
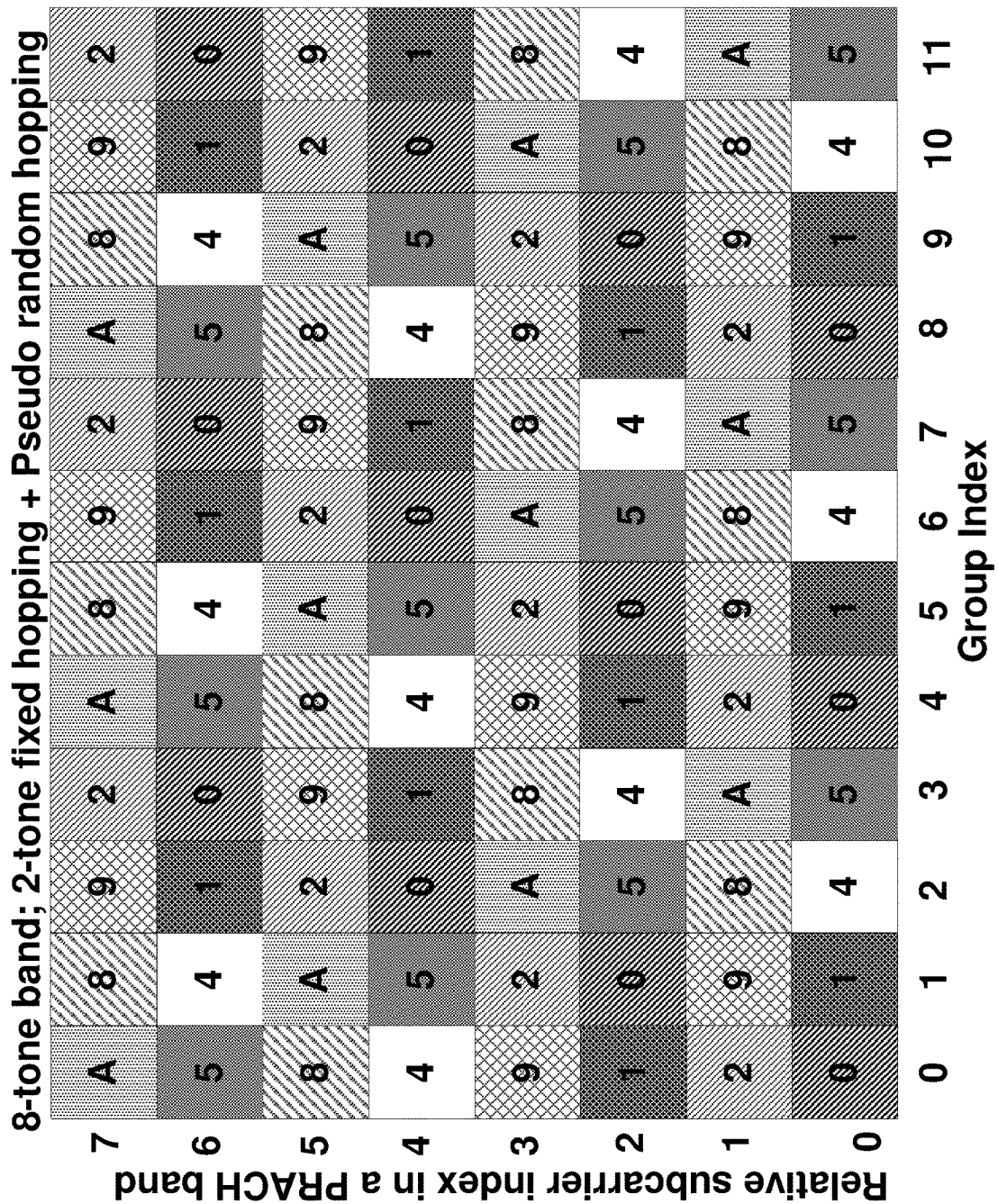
FIG. 9 is a block diagram illustrating an example of multiplexing of frequency hopping patterns within an 8-tone band, according to one or more other embodiments.

The hopping patterns herein are general and apply to any subcarrier spacing, any preamble length (i.e., number of symbol groups), any size of fixed hopping, and any number of tones in a PRACH band. FIG. 8 provides another example of a hopping pattern with an 8-tone PRACH band and 2-tone fixed hopping. The hopping pattern is generated in the same way as FIG. 4. FIG. 9 provides another example of the hopping pattern with 8-tone PRACH band and 2-tone fixed hopping. The hopping pattern is generated in the same way as FIG. 5.

According to one or more embodiments, one or more of the configuration parameters of PRACH such as the starting index of the PRACH band ($n_{start}$), the number of tones in the PRACH band ($N_b^{sc}$), and the size of the fixed hopping ($n_{micro}$), are signaled as configuration information, e.g., using a System Information Block (SIB), or a Master Information Block (MIB), or the combination of MIB and SIB. Note that some of these configurations may be fixed and thus does not need to be signaled.

Note that while the description above focuses on orthogonal resource allocation in frequency domain with frequency hopping, it is understood by those skilled in the art that resource allocation in other dimension is also possible. For example, in the time domain, non-overlapping sets of subframes can be used to define orthogonal PRACH resources; in the sequence domain, orthogonal preamble sequences can be used by different UEs even when their time/frequency resources overlap. It is understood that configuration parameters defining time-domain aspects and sequence-domain aspects are also defined, either in a fixed manner or broadcast via MIB and/or SIB. Frequency domain configuration herein is to be used together with those of time and sequence domain to fully define the PRACH resource configuration.

As noted above, random access embodiments herein may be applied to LTE-based systems and/or NB-IoT systems. In this context, with respect to the existing LTE random access design, random access serves multiple purposes such as initial access when establishing a radio link, scheduling request, etc. Among others, a main objective of random access is to achieve uplink synchronization, which is important for maintaining the uplink orthogonality in LTE. To preserve orthogonality among different user equipments (UE) in an OFDMA or SC-FDMA system, the time of arrival of each UE's signal needs to be within the cyclic prefix (CP) of the OFDMA or SC-FDMA signal at the base station.

Figure 10:
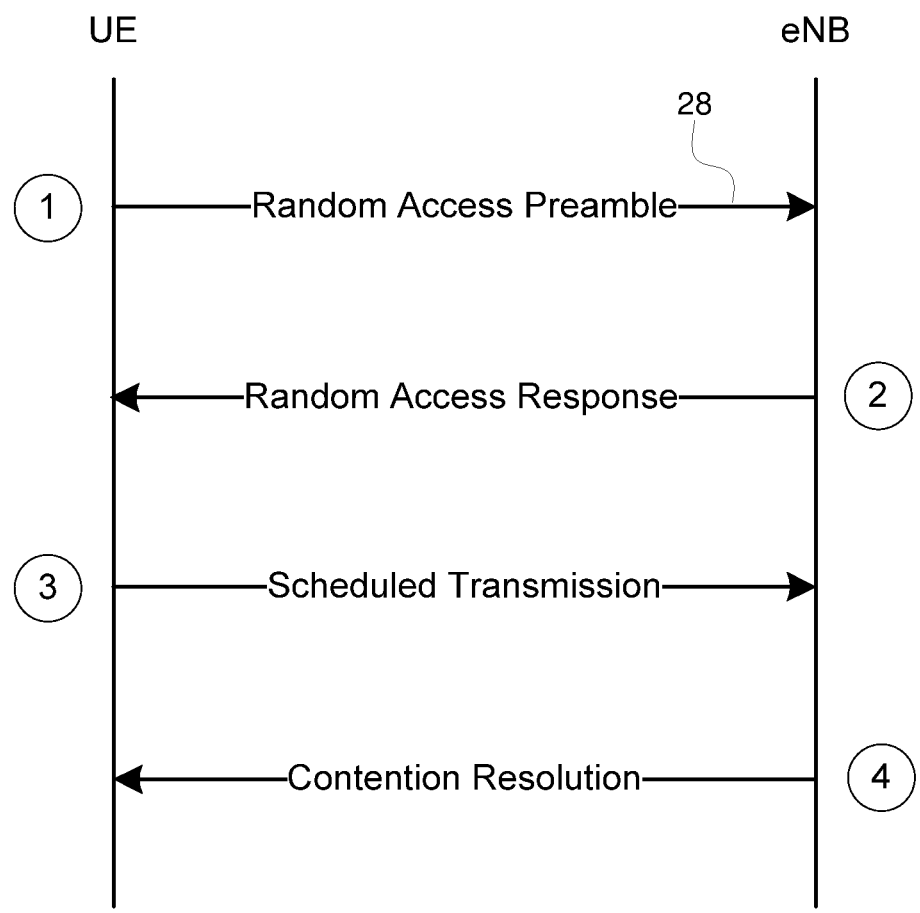
FIG. 10 is a call flow diagram illustrating steps of a random access procedure according to one or more embodiments.

LTE random access can be either contention-based or contention-free. The contention-based random access procedure consists of four steps, as illustrated in FIG. 10. Note that only the first step involves physical-layer processing specifically designed for random access, while the remaining three steps follow the same physical-layer processing used in uplink and downlink data transmission. For contention-free random access, the UE uses reserved preambles assigned by the base station. In this case, contention resolution is not needed, and thus only Steps 1 and 2 are required.

Figure 11:
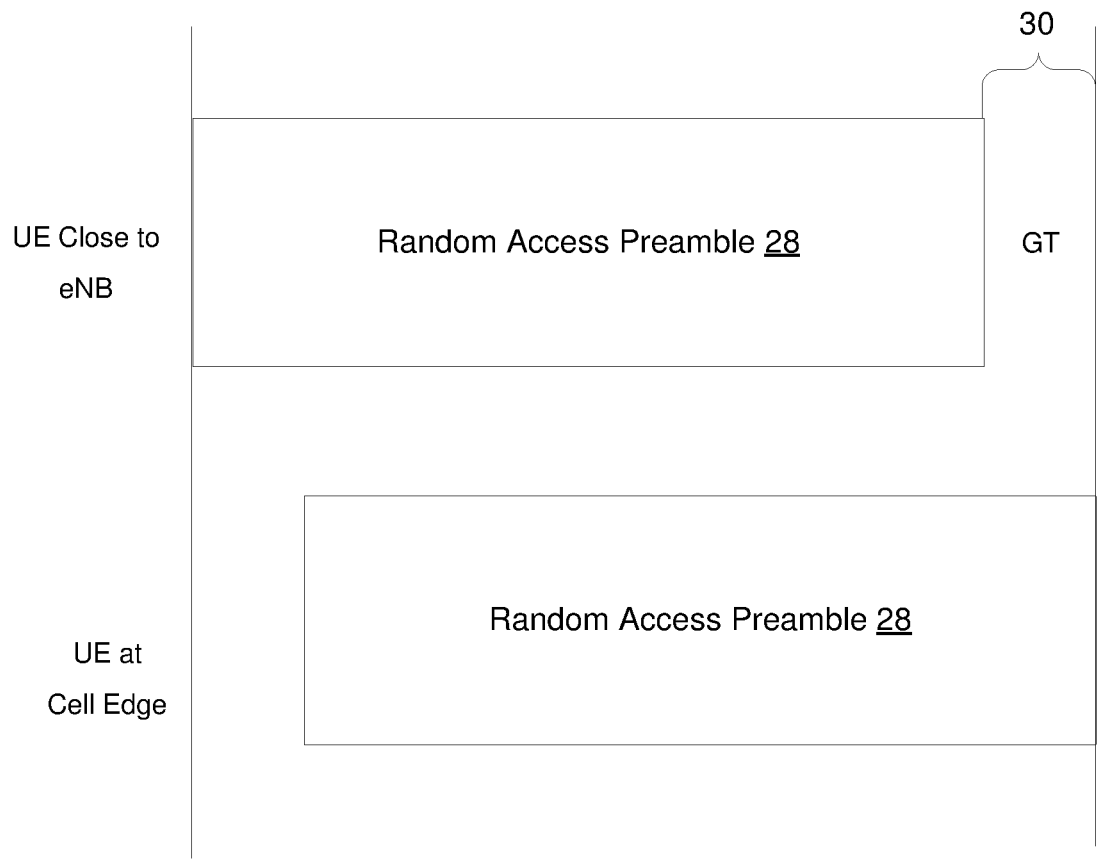
FIG. 11 is a timing diagram illustrating transmission of a random access preamble according to one or more embodiments.

As shown in FIG. 10, in the first step, a random access preamble signal 16 is sent by the UE in the form of a random access preamble 28 over a physical random access channel (PRACH). This preamble 28 may also be referred to as a PRACH preamble, a PRACH preamble sequence, or a PRACH signal. Regardless, the UE transmits the random access preamble 28 during a random access time segment illustrated in FIG. 11. The random access preamble 28 does not occupy the entire random access segment, leaving some time as guard time 30. As discussed earlier, to maximize PA efficiency and coverage, it is desirable to have PRACH preambles as close to constant-envelope as possible. Also, the PRACH preambles should be designed such that accurate time-of-arrival estimation can be performed by the base stations.

Figure 12:
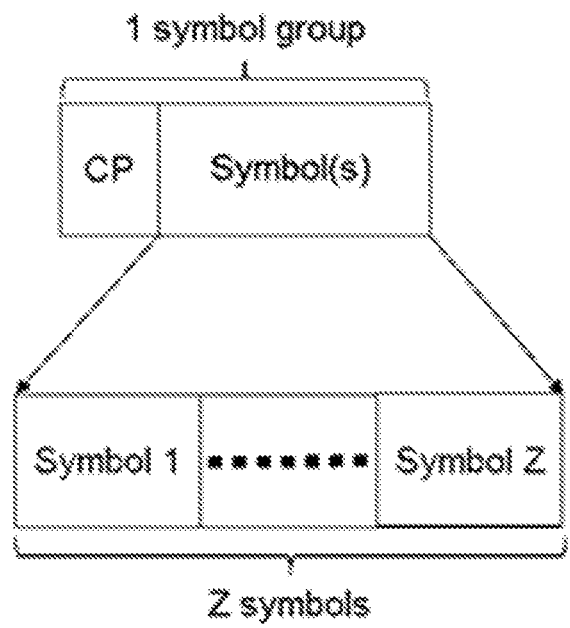
FIG. 12 is a block diagram illustrating a symbol group according to one or more embodiments.
Figure 13:
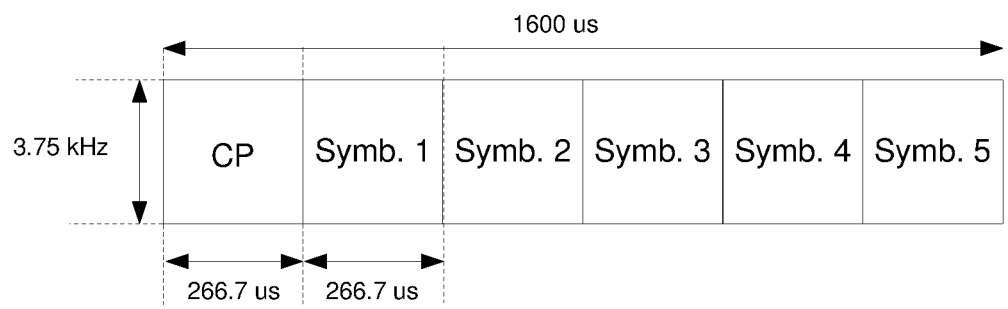
FIG. 13 is a block diagram illustrating a particular example of a symbol group according to some embodiments.

The basic structure of a PRACH symbol group (e.g., a symbol group 18) according to some embodiments herein is illustrated in FIG. 12, and an example is given in FIG. 13. It is basically a single tone (subcarrier) OFDM signal. Unlike a traditional OFDM symbol where the non-cyclic-prefix (non-CP) part consists of a single symbol, the non-CP part of the PRACH symbol group may consist of one or more symbols.

The symbols in the random access preamble signal 16 can be all identical, even across different symbol groups. In this case, it may be easier to guarantee phase continuity between adjacent symbol groups and thus help maintain close-to-zero peak-to-average-power ratio (PAPR) of the preamble signal. In other embodiments, by contrast, the symbols in a group are identical, but may be different across symbol groups. This may be viewed as applying an additional layer of code division multiplexing (CDM) over groups. In this case it is not easier to guarantee phase continuity between adjacent symbol groups, but the embodiment further randomizes the interference to other transmissions from a system level perspective.

In yet other embodiments, the symbols in a group are different, but the whole symbol group is repeated across groups. This may be seen as applying an additional layer of CDM within a group. In this case it is not easier to guarantee phase continuity between adjacent symbol groups, but the embodiment further randomizes the interference to other transmissions from a system level perspective, albeit in a limited sense because symbols only change within a group.

In still other embodiments, symbols can be different both within a group and across groups. This may be seen as applying an additional layer of CDM over symbols, such that CDM is applied to each symbol group so as to make symbols in a group possibly different. In this case it is not easier to guarantee phase continuity between adjacent symbol groups, but the embodiment randomizes the interference to other transmissions from a system level perspective to the greatest possible extent.

In a further embodiment, the last symbol in each symbol group is fixed. Since the cyclic prefix is the same as a last part of the whole of the last symbol, this structure makes it easier to guarantee phase continuity between adjacent symbol groups and thus helps maintain close-to-zero PAPR of the preamble signal. If additional interference randomization (in addition to those brought by pseudo random hopping, logical tone index, and/or cell ID dependent sequence values) is desired, values for other symbols may be appropriately chosen.

The specific values of the symbol(s) in a group, whether they are all identical or different, may in some embodiments be cell ID dependent and/or logical tone index dependent.

According to the example in FIG. 13, the subcarrier spacing is 3.75 kHz. However, embodiments herein apply to any subcarrier spacing. According to some embodiments, the PRACH signal consisting of one or more symbol groups is spread in time. Thus, a number of OFDM symbol groups, each one as illustrated in FIG. 12, are concatenated to form a PRACH preamble. That is, each group 18 as described above may comprise that illustrated in FIGS. 12 and/or 13. But the frequency positions of the symbol groups 18 of the same PRACH preamble vary according to a hopping pattern as described above.

As suggested above, a tone as used herein may correspond to a subcarrier in some embodiments. A tone may for instance correspond to an OFDM subcarrier or an SC-FDMA subcarrier.

Some embodiments herein find particular applicability to NB-IoT. For example, to support a 35 km cell size, the fixed size hopping distance may be limited to 1 tone. And using additional hopping sizes may improve time-of-arrival estimation accuracy. For example, an additional 6-tone hopping on top of the one-tone hopping may be used. However, the values of the second hopping affect the time-of-arrival estimation accuracy. For example, with increased tone hopping value 2, the center of CDF is improved but the tail is also elevated. The last problem can be solved if an optimized hopping pattern is used, as detailed in the following.

As opposed to using additional fixed size hopping on top of the one-tone hopping, it may be more beneficial and flexible to use pseudo random hopping on top of fixed size hopping. Logically, pseudo random hopping may be thought of as a type of cell specific CDM if the hopping is cell specific. The benefits of using pseudo random hopping on top of fixed size hopping for NB-PRACH are summarized as follows.

First, pseudo random hopping can solve the elevated tail issues and has the potential of providing more accurate time-of-arrival estimation accuracy. In particular, timing estimation accuracy is inversely proportional to the signal bandwidth. However, with increased tone hopping value 2, the center of CDF is improved but the tail is also elevated. This seems to contradict the conventional intuition. Upon further consideration, though, the phenomenon is due to the fixed hopping value in the second level. This issue can be solved by pseudo random hopping, as shown in FIG. 14A-D.

Figure 14B:
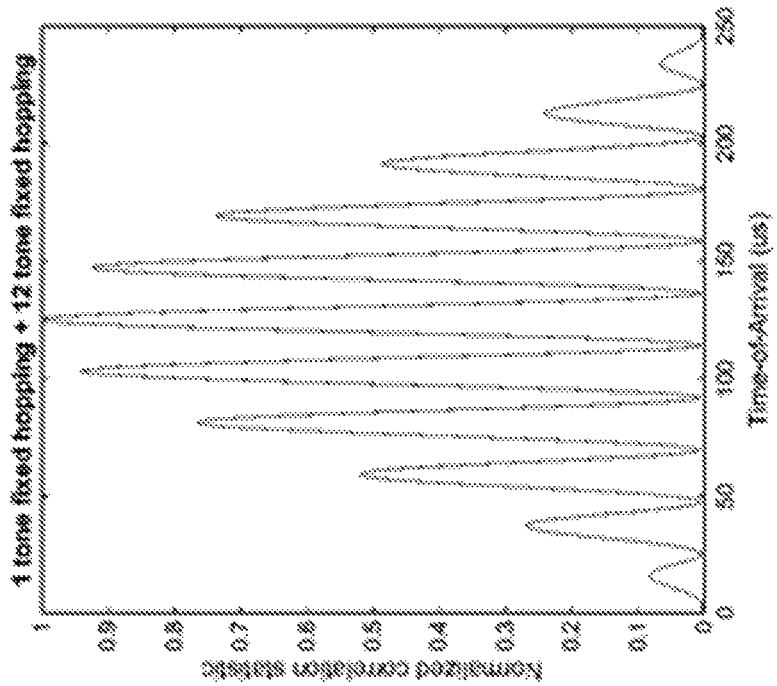
FIGS. 14A-14B are graphs illustrating time of arrival performance for a frequency hopping pattern that employs two fixed size hopping distances.
Figure 14A:
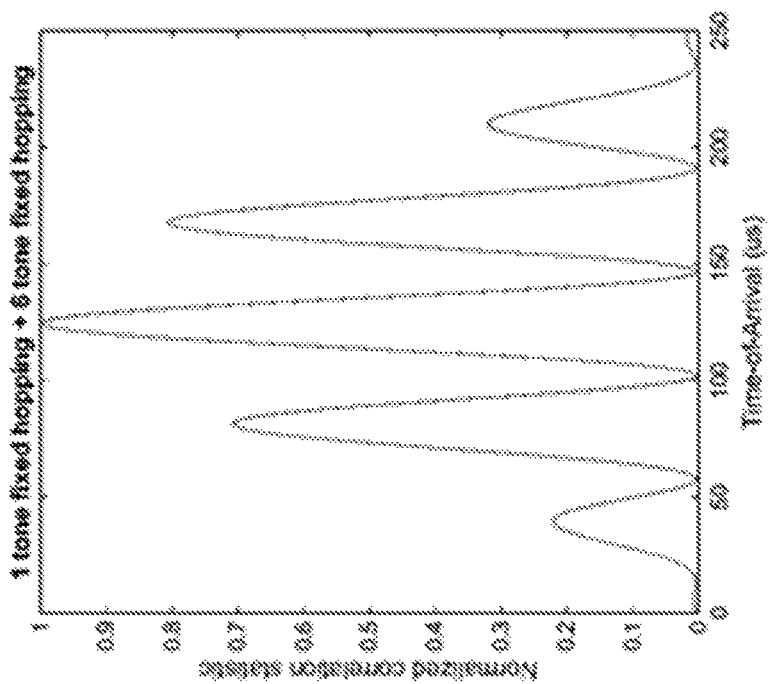
Figure 14D:
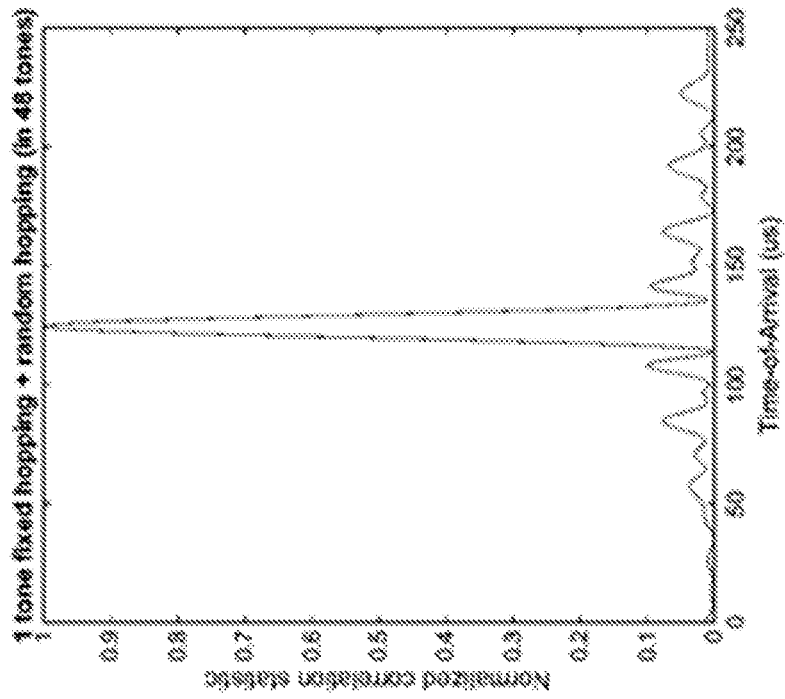
FIGS. 14C-14D are graphs illustrating time of arrival performance for a frequency hopping pattern that employs a fixed size hopping distance as well as a pseudo random hopping distance according to one or more embodiments.
Figure 14C:
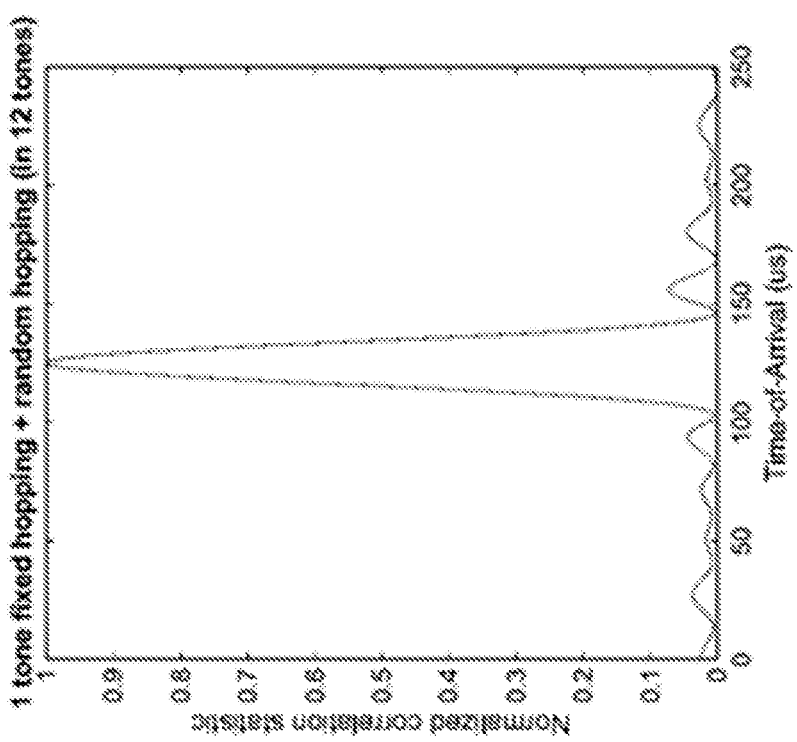

Specifically, due to 2*Pi phase rotation ambiguity, hopping by more than one tone can introduce side peaks with 35 km cell size. The larger the second level hopping value, the more the side peaks, as shown in FIGS. 14A and 14B. These side peaks cause estimation errors and lead to the elevated error tails. In contrast, pseudo random hopping solves this issue, as shown in FIGS. 14C and 14D. Further, the wider the pseudo random hopping range, the narrower the correlation peak (and thus potentially the more accurate the estimation would be). This matches the conventional wisdom that a signal of wider bandwidth can enable better timing estimation performance.

Second, pseudo random hopping is already implemented in LTE for other purposes. Pseudo random hopping according to some embodiments herein is reused for NB-IoT. For NB-PRACH, a pseudo random hopping similar to LTE PUSCH type 2 hopping (see TS 36.211 (Release 12) and TS 36.213 (Release 12) can be used on top of the fixed size (e.g., one tone) hopping.

Third, pseudo random hopping can mitigate inter-cell interference. Without pseudo random hopping, the NB-PRACH transmissions in one cell may cause persistent interference to the NB-PRACH and/or NB-PUSCH transmissions in the neighboring cells. Persistent interference may exist even in the same cell, because (i) multiple intra-cell NB-PRACH transmissions at the same time may not be fully orthogonal due to e.g. residual carrier frequency offsets, and (ii) NB-PUSCH and NB-PRACH are not orthogonal if they are frequency multiplexed.

Fourth, pseudo random hopping may increase NB-PRACH capacity. Neighboring cells may configure different frequency resources for NB-PRACH. While this approach avoids inter-cell NB-PRACH interference, this may reduce NB-PRACH capacity. In particular, there may only be 12 tones (or equivalently, 12 preambles) in a cell. Note that each cell may reserve some preambles for contention free random access. Also, if LTE type preamble partition was used to indicate information in Msg1, the number of available preambles would become even more limited in each partitioned group. Putting these together, NB-PRACH may become the bottleneck of the NB-IoT system if its resource is not carefully dimensioned.

As mentioned earlier, pseudo random hopping may be thought of as a type of cell-specific CDM. This CDM allows neighboring cells to use the same frequency resources for NB-PRACH. This greatly increases NB-PRACH capacity, compared to FDM of NB-PRACH among neighboring cells. Specifically, with 180 kHz bandwidth and 3.75 kHz subcarrier spacing, up to 48 NB-PRACH preambles can be used in a cell.

Fifth, pseudo random hopping provides more hopping flexibility and is more forward compatible. Indeed, two-level hopping with two fixed hopping sizes may impose some restriction on possible NB-PRACH resource configuration. In particular, two-level hopping always requires the NB-PRACH band to have 12 tones, which is not flexible.

In contrast to two-level hopping with two fixed hopping sizes, pseudo random hopping essentially uses multiple hopping sizes and is more flexible. For example, a cell may configure different NB-PRACH bandwidths. NB-PRACH transmission with one-level fixed hopping plus additional pseudo random hopping can be readily scaled as the bandwidth increases. If fixed-size two-level hopping is used, many different hopping sizes may need to be defined.

Moreover, frequency hopping will likely become a NB-IoT feature in future especially when multiple NB-IoT PRBs are configured. Using pseudo random hopping is more forward compatible. If fixed-size two-level hopping is used, additional hopping sizes might need to be defined in future when more NB-IoT PRBs are available.

In some embodiments, the preamble length should be long enough to help the base station accumulate enough energy to obtain satisfactory performance, including for instance high detection rate, low false alarm rate, and good timing estimation accuracy. Therefore, depending on the coverage target, the preamble length may be chosen accordingly. Multiple lengths in this regard may be defined if the single tone frequency hopping PRACH is used for all coverage classes.

Figure 15B:
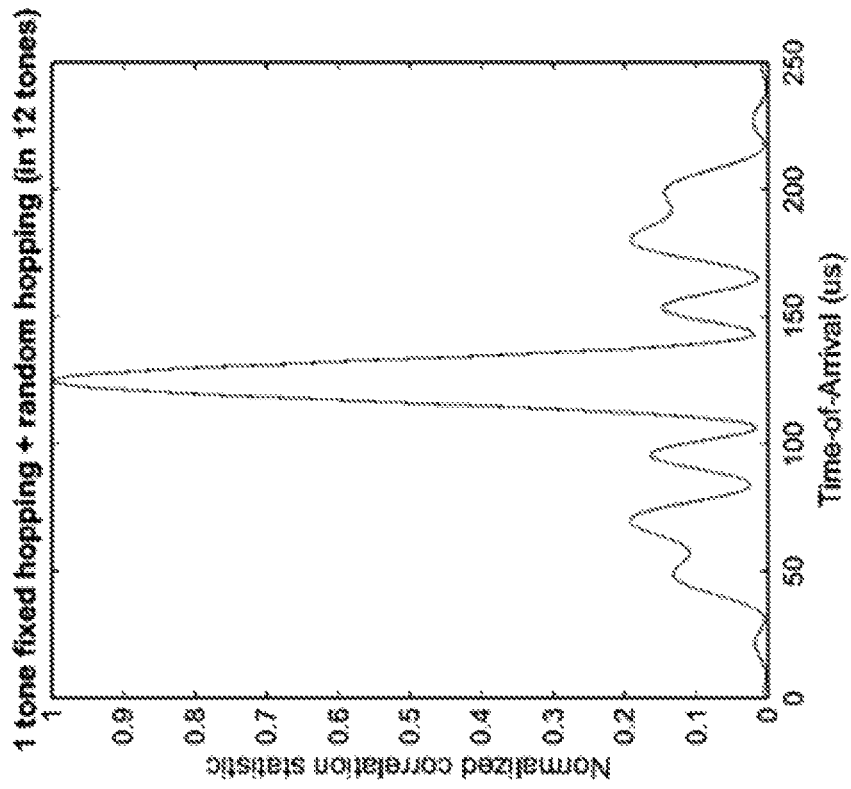
FIGS. 15A-15F are graphs illustrating time of arrival performance for a frequency hopping pattern that employs a fixed size hopping distance as well as a pseudo random hopping distance within different hopping ranges and for different preamble lengths, according to some embodiments.
Figure 15A:
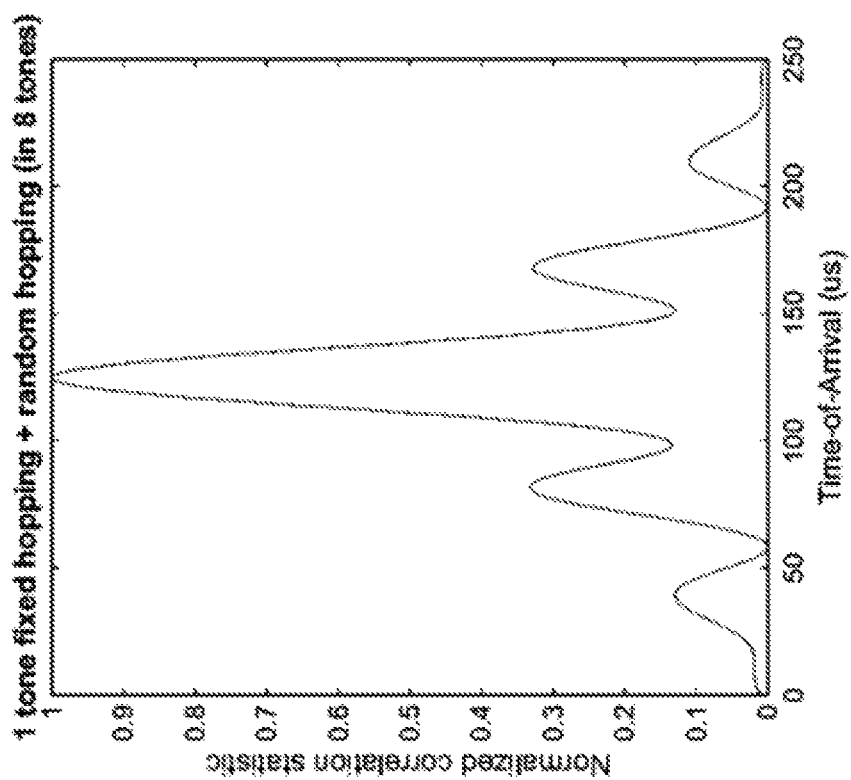
Figure 15C:
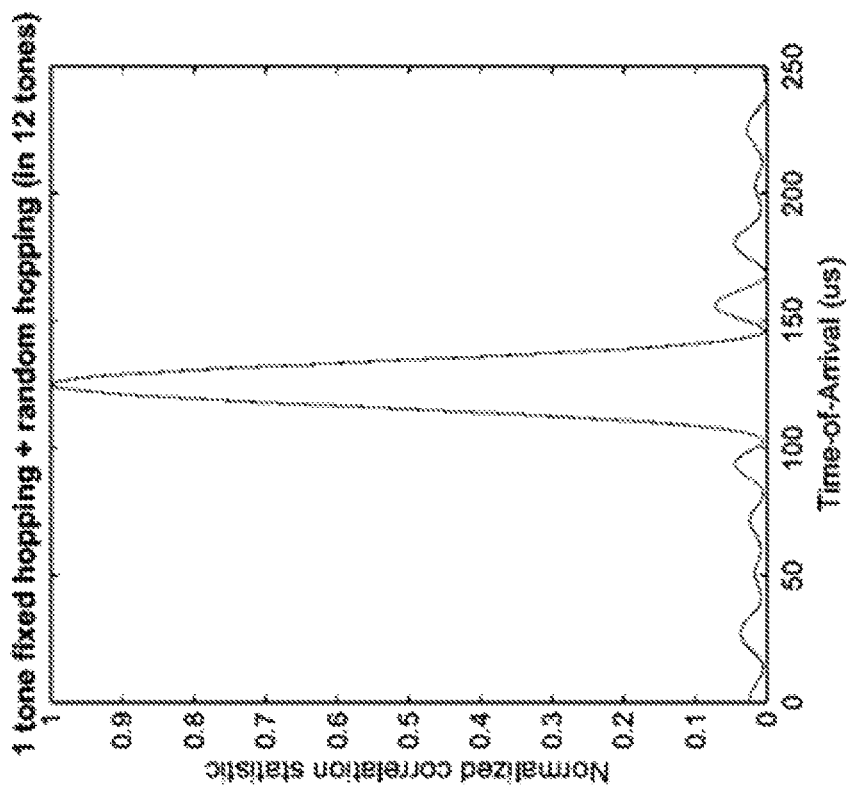
Figure 15D:
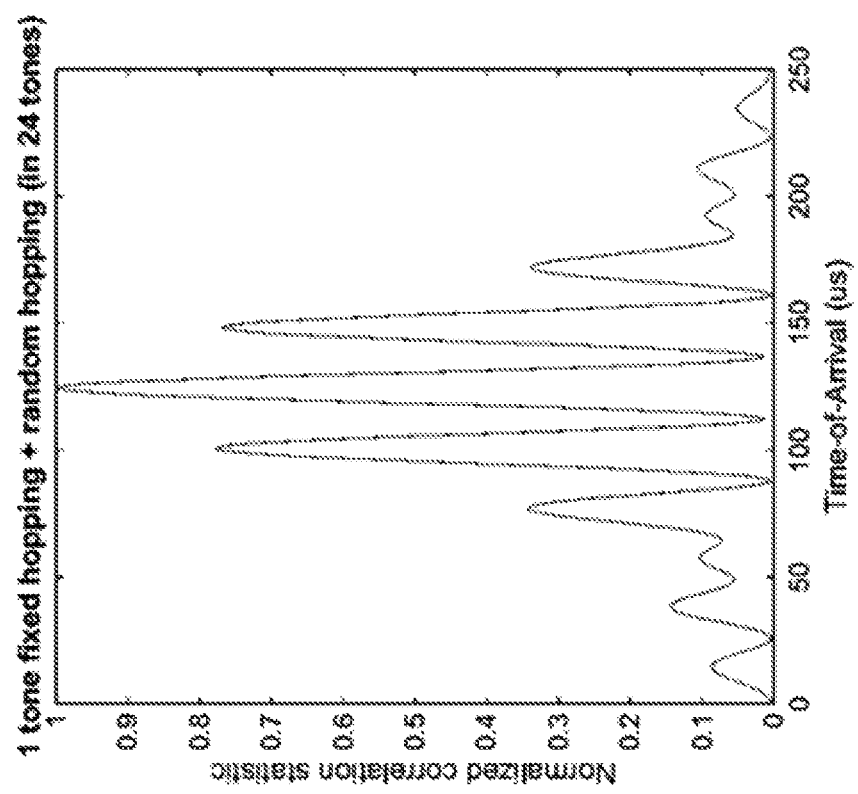
Figure 15F:
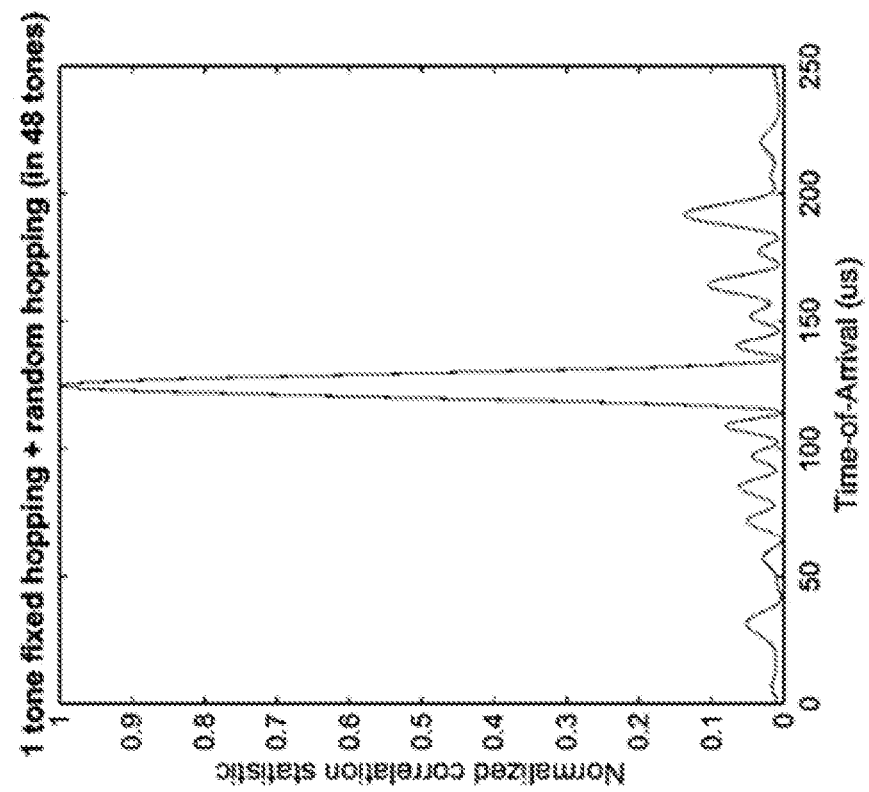
Figure 15E:
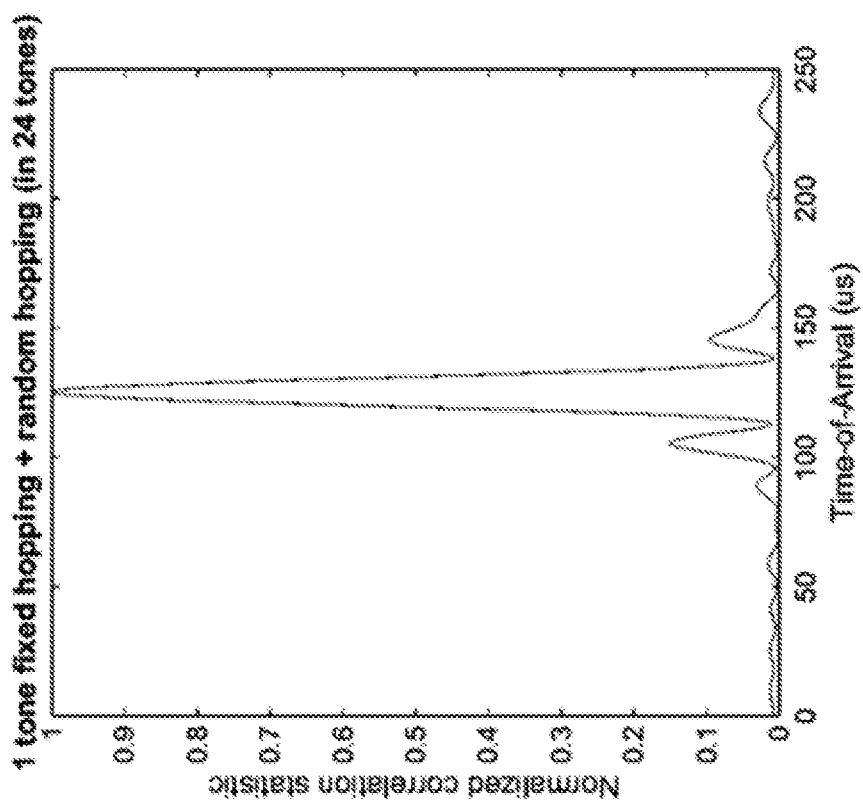

Note that in embodiments which employ pseudo random hopping, the pseudo random hopping range may be related to the preamble length to some extent. In particular, if a preamble length is short, but the pseudo random hopping range is large, many correlation side peaks may arise. This is illustrated in FIGS. 15A-15F. Indeed, as shown in FIGS. 15A-15C, shorter preambles for users with 144 dB MCL results in more substantial correlation side peaks for larger pseudo random hopping ranges. By contrast, as shown in FIGS. 15D-15F, longer preambles for users with 164 dB MCL results in less substantial correlation side peaks than those in FIGS. 15A-15C, even for the same pseudo random hopping ranges. This means that longer preamble lengths can afford larger pseudo random hopping ranges. Accordingly, in some embodiments, different pseudo random hopping ranges are used for different preamble lengths (e.g., large range for long preamble length and short range for short preamble length).

In some embodiments, the eNB may be able to configured the following parameters of single tone frequency hopping NB-PRACH: time resource information that informs UEs "when to send", preamble sequence information that directs UEs "what to send", and frequency resource information that directs UEs "where to send". Therefore, in some embodiments, NB-IoT UEs may have the following knowledge to send a single tone frequency hopping NB-PRACH preamble: possible starting times of NB-PRACH possibilities, preamble sequence values, starting indices of one or more NB-PRACH bands, CP length, number of symbols per group, number of groups, micro hopping size, and/or pseudo random hopping range. This information may be signaled using a System Information Block (SIB) or a Master Information Block (MIB), or a combination of SIB and MIB. Some of these configurations may be fixed and thus do not need to be signaled.

As an example, a set of design configuration parameters may be summarized in Table 1 below:

as well as to successors of the E-UTRAN. Thus, references herein to signals using terminology from the 3GPP standards for LTE should be understood to apply more generally to signals having similar characteristics and/or purposes, in other networks.

A radio node herein is any type of node (e.g., a base station or wireless communication device) capable of communicating with another node over radio signals. A radio network node 12 is any type of radio node capable and/or configured to operate within a wireless communication network, such as a base station. A network node is any type of node capable and/or configured to operate within a wireless communication network, whether within a radio access network or a core network of the wireless communication network. A wireless communication device 14 is any type of radio node capable of communicating with a radio network node over radio signals. A wireless communication device 14 may therefore refer to a machine-to-machine (M2M) device, a machine-type communications (MTC) device, a NB-IoT device, etc. A wireless communication device may also be referred to as a user equipment, a radio device, a radio communication device, a wireless terminal, or simply a terminal unless the context indicates otherwise, the use of any of these terms is intended to include device-to-device UEs or devices, machine-type devices or devices capable of machine-to-machine communication, sensors equipped with a wireless communication device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be a UE.

In an IOT scenario, a wireless communication device 14 as described herein may be, or may be comprised in, a

| Cell size (km) | MCL (dB) | Subcarrier spacing (kHz) | Tcp (us) | Number of symbols per group | Number of groups | Hopping pattern | Pseudo random hopping range |
|---|---|---|---|---|---|---|---|
| 35 | 144 | 3.75 | 266.7 | 5 | 8 | 1 tone micro hopping + pseudo random hopping | {8, 12, 16} tones |
|  | 154 | 3.75 | 266.7 | 5 | 24 | 1 tone micro hopping + pseudo random hopping | {8, 12, 16} tones |
|  | 164 | 3.75 | 266.7 | 5 | 120 | 1 tone micro hopping + pseudo random hopping | {8, 12, 16} tones |
| 8 | 144 | 3.75 | 66.7 | 5 | 8 | {1 or 4} tone micro hopping + pseudo random hopping | {8, 12, 16} tones See Remark 1 |
|  | 154 | 3.75 | 66.7 | 5 | 24 | {1 or 4} tone micro hopping + pseudo random hopping | {8, 12, 16} tones |
|  | 164 | 3.75 | 66.7 | 5 | 120 | {1 or 4} tone micro hopping + pseudo random hopping | {8, 12, 16} tones |

Remark 1: The possible pseudo random hopping ranges are related to the size of the used micro hopping.

Despite particular applicability to NB-IoT in some examples, though, it will be appreciated that the techniques may be applied to other wireless networks, including eMTC machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Furthermore, in an NB-IoT context, it may be the case that, to support lower manufacturing costs for NB-IOT devices, the transmission bandwidth is reduced to one physical resource block (PRB) of size 180 KHz. Both frequency division duplexing (FDD) and TDD are supported. For FDD (i.e. the transmitter and receiver operate at different carrier frequencies) only half-duplex mode needs to be supported in the UE. The lower complexity of the devices (e.g. only one transmission/receiver chain) means that a small number of repetitions might be needed also in normal coverage. Further, to alleviate UE complexity, the working assumption may be to have cross-subframe scheduling. That is, a transmission is first scheduled on Enhanced Physical DL Control Channel (E-PDCCH aka M-EPDCCH) and then the first transmission of the actual data on the Physical DL Shared Channel (PDSCH) is carried out after the final transmission of the M-EPDCCH.

One or more embodiments herein thus generally include using a single subcarrier signal in any OFDM or SC-FDMA symbol group interval for random access. In different OFDM or SC-FDMA symbol intervals different subcarrier (frequencies) may be used. This can be thought of as "frequency hopping". The hopping patterns consist of both fixed size hopping and additional multi-level hopping. Fixed size hopping includes both "Upward" and "Downward" hopping to fully utilize frequency resource. Fixed size hopping ensures the targeting time-of-arrival estimation range can be met by PRACH. The multi-level hopping sizes can be achieved by, for example, pseudo random hopping that can be considered as hopping of different sizes that is predetermined. The additional multi-level hopping greatly improves the time-of-arrival estimation accuracy. Orthogonal frequency-hopping patterns between different PRACH preambles may be designed.

Since the new PRACH signal achieves close to 0 dB PAPR, it reduces the need for PA backoff to the greatest extent and maximizes PA efficiency. Thus, it maximizes the PRACH coverage and battery efficiency. The new PRACH signal is compatible with SC-FDMA and orthogonal frequency-division multiple-access (OFDMA). Thus, it can be easily implemented using existing SC-FDMA or OFDMA signal generator. This reduces both development cost and time-to-market. Further, hopping patterns are carefully designed such that (1) accurate time-of-arrival estimation can be performed by the base station, (2) the frequency resources can be fully utilized by PRACH while maintaining orthogonality of different preambles. The accurate time-of-arrival estimation is extremely important if a short CP (like 4.7 us in LTE) is used in PUSCH of NB-IoT.

In view of the various modifications and variations described above, those skilled in the art will appreciate that the wireless communication device 14 (e.g., user equipment) herein may perform the processing 100 shown in FIG. 16A for transmitting a random access preamble signal. This processing 100 comprises generating a random access preamble signal that comprises multiple symbol groups, with each symbol group on a single tone during a different time resource, according to a frequency hopping pattern that hops the random access preamble signal a fixed frequency distance at one or more symbol groups and hops the random access preamble signal a pseudo random frequency distance at one or more other symbol groups (Block 110). Each symbol group comprises one or more symbols. The processing 100 further entails transmitting the random access preamble signal (Block 120).

Those skilled in the art will also appreciate that the radio network node 12 may perform the processing 200 shown in FIG. 16B for receiving a random access preamble signal. The processing 200 comprises receiving a signal from a wireless communication device (e.g., a user equipment) (Block 210). Processing 200 also includes processing the received signal in an attempt to detect a random access preamble signal that comprises multiple symbol groups, with each of the symbol groups on a single tone during a different time resource, according to a frequency hopping pattern that hops the random access preamble signal a fixed frequency distance at one or more symbol groups and hops the random access preamble signal a pseudo random frequency distance at one or more other symbol groups (Block 220). Each symbol group comprises one or more symbols.

Still further, the radio network node 12 may perform the processing 300 shown in FIG. 17A for configuring a wireless communication device (e.g., a user equipment) to transmit a random access preamble signal comprising multiple symbol groups, each symbol group comprising one or more symbols. The processing 300 comprises generating configuration information indicating one or more parameters for a frequency hopping pattern according to which the wireless communication device is to generate each of the symbol groups on a single tone during a different time resource, wherein the frequency hopping pattern hops the random access preamble signal a fixed frequency distance at one or more symbol groups and hops the random access preamble signal a pseudo random frequency distance at one or more other symbol groups (Block 310). The processing 300 also comprises transmitting the configuration information to the wireless communication device (Block 320).

The wireless communication device 14 may correspondingly perform the processing 400 in FIG. 17B. The processing 400 includes receiving the configuration information indicating one or more parameters for a frequency hopping pattern according to which the wireless communication device is to generate each of the symbol groups on a single tone during a different time resource, wherein the frequency hopping pattern hops the random access preamble signal a fixed frequency distance at one or more symbol groups and hops random access preamble signal a pseudo random frequency distance at one or more other symbol groups (Block 410). Processing 400 also includes configuring the device 14 to generate the random access preamble signal according to the received configuration information (Block 420).

In still other embodiments, a user equipment 14 (or, more generally, a wireless communication device) herein may perform the processing 500 shown in FIG. 18A for transmitting a random access preamble signal. This processing 500 comprises generating a random access preamble signal that comprises multiple symbol groups, with each symbol group on a single tone during a different time resource, according to a frequency hopping pattern that hops the random access preamble signal from at least one of the symbol groups to an adjacent symbol group over a fixed frequency distance and further hops the random access preamble signal from at least one of the symbols groups to an adjacent symbol group over a pseudo random frequency distance (Block 510). Each symbol group comprises one or more symbols. The processing 500 further entails transmitting the random access preamble signal (Block 520).

Those skilled in the art will also appreciate that, in other embodiments, a base station 12 (or, more generally, a radio network node) may perform the processing 600 shown in FIG. 18B for receiving a random access preamble signal. The processing 600 comprises receiving a signal from a user equipment (Block 610). Processing 600 also includes processing the received signal in an attempt to detect a random access preamble signal that comprises multiple symbol groups, with each of the symbol groups on a single tone during a different time resource, according to a frequency hopping pattern that hops the random access preamble signal from at least one of the symbol groups to an adjacent symbol group over a fixed frequency distance and further hops the random access preamble signal from at least one of the symbol groups to an adjacent symbol group over a pseudo random frequency distance (Block 620). Each symbol group comprises one or more symbols.

In still further embodiments, a base station 12 (or, more generally, a radio network node) may perform the processing 700 shown in FIG. 19A for configuring a user equipment to transmit a random access preamble signal comprising multiple symbol groups, each symbol group comprising one or more symbols. The processing 700 comprises generating configuration information indicating one or more parameters for a frequency hopping pattern according to which the wireless communication device is to generate each of the symbol groups on a single tone during a different time resource, wherein the frequency hopping pattern hops the random access preamble signal from at least one of the symbol groups to an adjacent symbol group over a fixed frequency distance and further hops the random access preamble signal from at least one of the symbol groups to an adjacent symbol group over a pseudo random frequency distance (Block 710). The processing 700 also comprises transmitting the configuration information to the user equipment (Block 720).

The user equipment 14 may correspondingly perform the processing 800 in FIG. 19B in further embodiments. The processing 800 includes receiving the configuration information indicating one or more parameters for a frequency hopping pattern according to which the user equipment 14 is to generate each of the symbol groups on a single tone during a different time resource, wherein the frequency hopping pattern hops the random access preamble signal from at least one of the symbol groups to an adjacent symbol group over a fixed frequency distance and further hops the random access preamble signal from at least one of the symbol groups to an adjacent symbol group over a pseudo random frequency distance (Block 810). Processing 800 also includes configuring the user equipment 14 to generate the random access preamble signal according to the received configuration information (Block 820).

Note that the wireless communication device 14 (e.g., user equipment) as described above may perform the processing herein by implementing any functional means or units. In one embodiment, for example, the wireless communication device 14 comprises respective circuits or circuitry configured to perform the steps shown in FIGS. 16A, 17A, 18A, and/or 19B. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 20B:
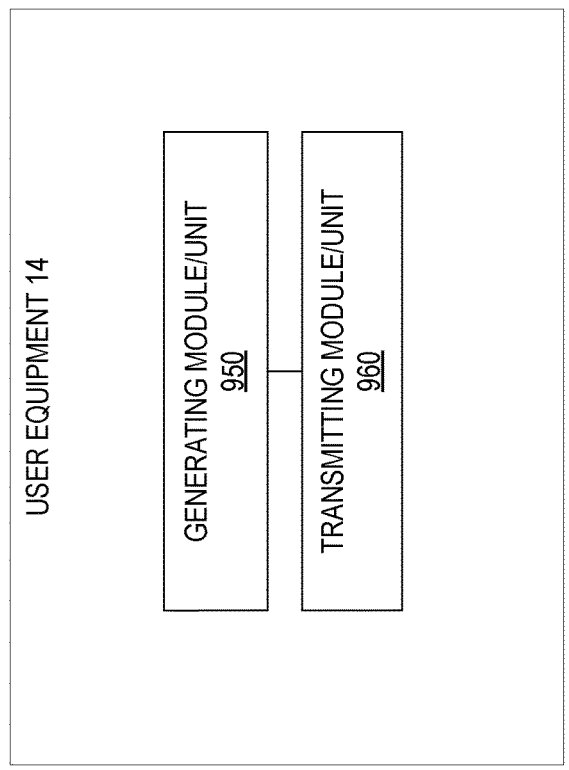
FIG. 20B is a block diagram of a user equipment according to other embodiments.
Figure 20A:
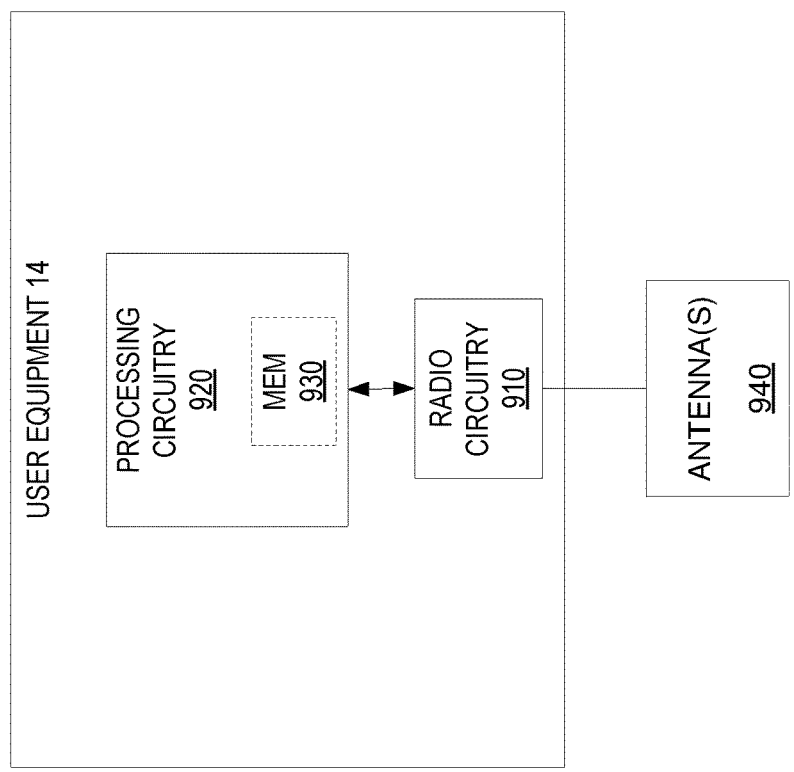
FIG. 20A is a block diagram of a user equipment according to some embodiments.

FIG. 20A illustrates additional details of a user equipment 14 (or, more generally, a wireless communication device) in accordance with one or more embodiments. As shown, the user equipment 14 includes processing circuitry 920 and radio circuitry 910. The radio circuitry 910 is configured to transmit via one or more antennas 940. The processing circuitry 920 is configured to perform processing described above, e.g., in FIGS. 16A, 17B, 18A and/or 19B, such as by executing instructions stored in memory 930. The processing circuitry 920 in this regard may implement certain functional means or units.

FIG. 20B illustrates a user equipment 14 (or, more generally, a wireless communication device) that according to other embodiments implements various functional means or units, e.g., via the processing circuitry 920 in FIG. 20A. As shown, these functional means or units, e.g., for implementing the method in FIG. 16A, include for instance a generating module or unit 950 for generating a random access preamble signal that comprises multiple symbol groups, with each symbol group on a single tone during a different time resource, according to a frequency hopping pattern that hops the random access preamble signal a fixed frequency distance at one or more symbol groups and hops the random access preamble signal a pseudo random frequency distance at one or more other symbol groups, wherein each symbol group comprises one or more symbols. The user equipment 14 also includes a transmitting module or unit 960 for transmitting the random access preamble signal.

Figure 20C:
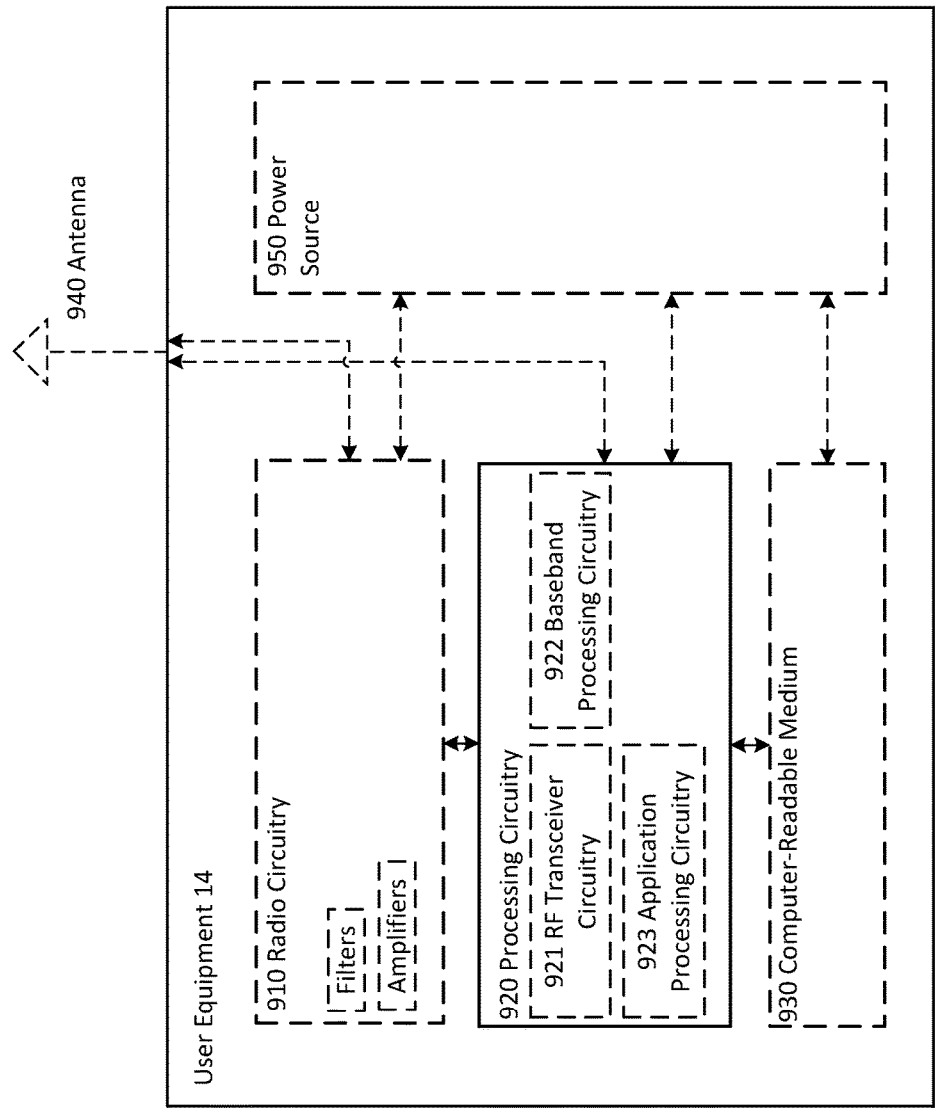
FIG. 20C is a block diagram of a user equipment according to yet other embodiments.

Additional details of the user equipment 14 are shown in relation to FIG. 20C. As shown in 20C, the example user equipment 14 includes an antenna 970, radio circuitry (e.g. radio front-end circuitry) 972, processing circuitry 974, and the user equipment 14 may also include a memory 982. The memory 982 may be separate from the processing circuitry 974 or an integral part of processing circuitry 974. Antenna 970 may include one or more antennas or antenna arrays, and is configured to send and/or receive wireless signals, and is connected to radio circuitry (e.g. radio front-end circuitry) 972. In certain alternative embodiments, user equipment 14 may not include antenna 970, and antenna 970 may instead be separate from user equipment 14 and be connectable to user equipment 14 through an interface or port.

The radio circuitry (e.g. radio front-end circuitry) 972 may comprise various filters and amplifiers, is connected to antenna 970 and processing circuitry 974, and is configured to condition signals communicated between antenna 970 and processing circuitry 974. In certain alternative embodiments, user equipment 14 may not include radio circuitry (e.g. radio front-end circuitry) 972, and processing circuitry 974 may instead be connected to antenna 970 without front-end circuitry 972.

Processing circuitry 974 may include one or more of radio frequency (RF) transceiver circuitry 976, baseband processing circuitry 978, and application processing circuitry 980. In some embodiments, the RF transceiver circuitry 976, baseband processing circuitry 978, and application processing circuitry 980 may be on separate chipsets. In alternative embodiments, part or all of the baseband processing circuitry 978 and application processing circuitry 980 may be combined into one chipset, and the RF transceiver circuitry 976 may be on a separate chipset. In still alternative embodiments, part or all of the RF transceiver circuitry 976 and baseband processing circuitry 978 may be on the same chipset, and the application processing circuitry 980 may be on a separate chipset. In yet other alternative embodiments, part or all of the RF transceiver circuitry 976, baseband processing circuitry 978, and application processing circuitry 980 may be combined in the same chipset. Processing circuitry 974 may include, for example, one or more central processing units (CPUs), one or more microprocessors, one or more application specific integrated circuits (ASICs), and/or one or more field programmable gate arrays (FPGAs).

The user equipment 14 may include a power source 984. The power source 984 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 972, processing circuitry 974, and/or memory 982. The power source 984, battery, power supply circuitry, and/or power management circuitry are configured to supply user equipment 14, including processing circuitry 974, with power for performing the functionality described herein.

Also note that the radio network node 12 as described above may perform the processing herein by implementing any functional means or units. In one embodiment, for example, the radio network node 12 comprises respective circuits or circuitry configured to perform the steps shown in FIGS. 16B, 17A, 18B, and/or 19A. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 21B:
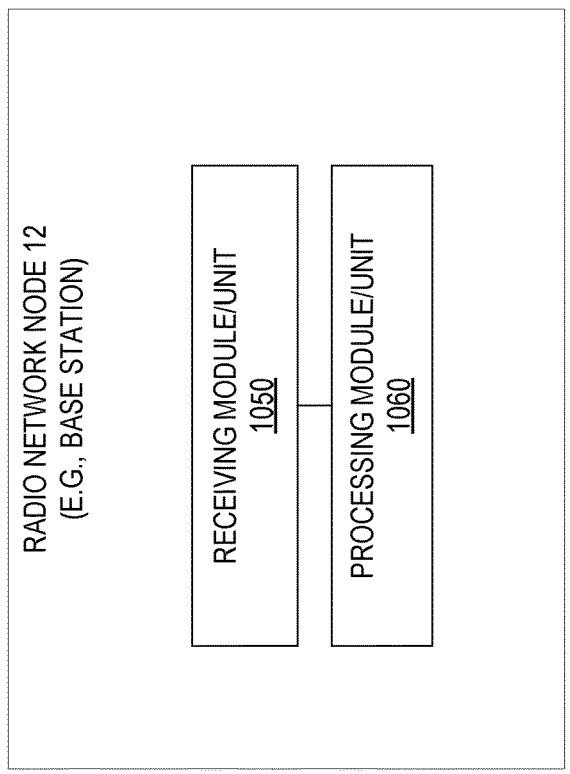
FIG. 21B is a block diagram of a base station according to other embodiments.
Figure 21A:
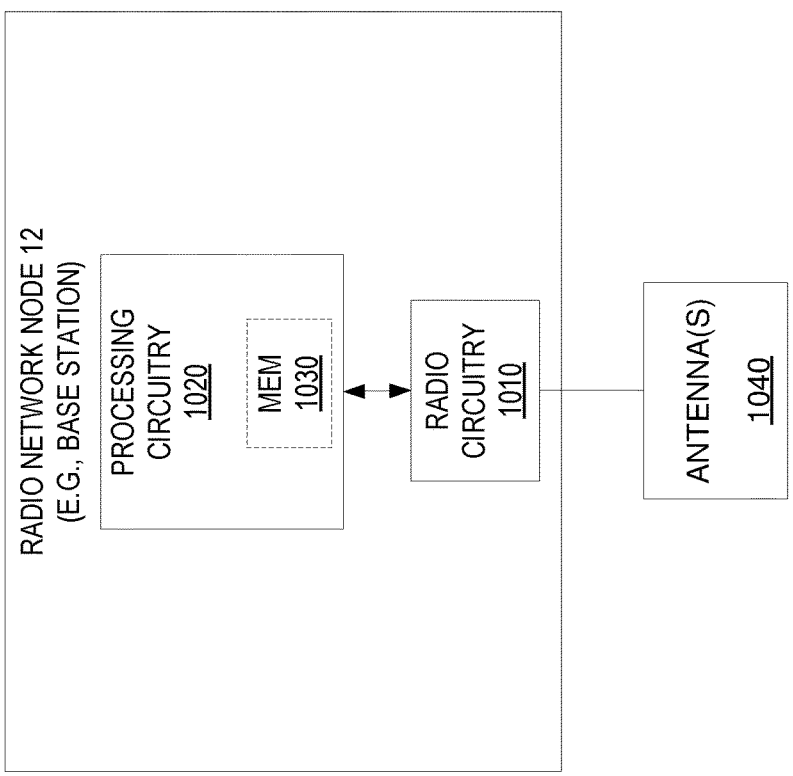
FIG. 21A is a block diagram of a base station according to some embodiments.

FIG. 21A illustrates additional details of a radio network node 12 (e.g., a base station) in accordance with one or more embodiments. As shown, the radio network node 12 includes processing circuitry 1020 and radio circuitry 1010. The radio circuitry 1010 is configured to transmit via one or more antennas 1040. The processing circuitry 1020 is configured to perform processing described above, e.g., in FIGS. 16B, 17A, 18B, and/or 19A, such as by executing instructions stored in memory 1030. The processing circuitry 1020 in this regard may implement certain functional means or units.

FIG. 21B illustrates a radio network node 12 (e.g., a base station) that according to other embodiments implements various functional means or units, e.g., via the processing circuitry 1020 in FIG. 21A. These functional means or units, e.g., for implementing the method in FIG. 16B, include for instance a receiving module or unit 1050 for receiving a signal from a user equipment. Further included is a processing module or unit 1060 for processing the received signal in an attempt to detect a random access preamble signal that comprises multiple symbol groups, with each of the symbol groups on a single tone during a different time resource, according to a frequency hopping pattern that hops the random access preamble signal a fixed frequency distance at one or more symbol groups and hops the random access preamble signal a pseudo random frequency distance at one or more other symbol groups, wherein each symbol group comprises one or more symbols.

Figure 21C:
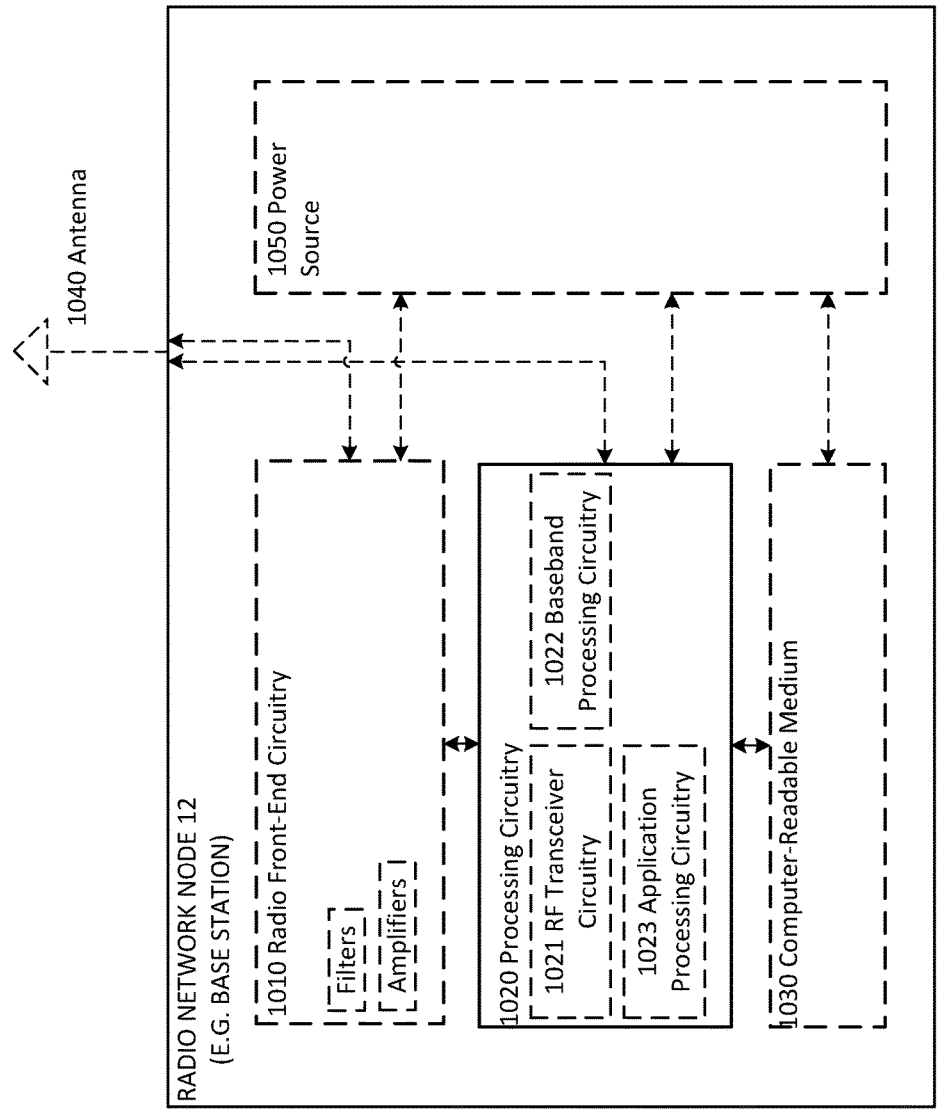
FIG. 21C is a block diagram of a base station according to yet other embodiments.

Additional details of the radio network node 12 are shown in relation to FIG. 21C. As shown in 21C, the example radio network node 12 includes an antenna 1070, radio circuitry (e.g. radio front-end circuitry) 1072, processing circuitry 1074, and the radio network node 12 may also include a memory 1082. The memory 1082 may be separate from the processing circuitry 1074 or an integral part of processing circuitry 1074. Antenna 1070 may include one or more antennas or antenna arrays, and is configured to send and/or receive wireless signals, and is connected to radio circuitry (e.g. radio front-end circuitry) 1072. In certain alternative embodiments, radio network node 12 may not include antenna 1070, and antenna 1070 may instead be separate from radio network node 12 and be connectable to radio network node 12 through an interface or port.

The radio circuitry (e.g. radio front-end circuitry) 1072 may comprise various filters and amplifiers, is connected to antenna 1070 and processing circuitry 1074, and is configured to condition signals communicated between antenna 1070 and processing circuitry 1074. In certain alternative embodiments, radio network node 12 may not include radio circuitry (e.g. radio front-end circuitry) 1072, and processing circuitry 1074 may instead be connected to antenna 1070 without front-end circuitry 1072.

Processing circuitry 1074 may include one or more of radio frequency (RF) transceiver circuitry 1076, baseband processing circuitry 1078, and application processing circuitry 1080. In some embodiments, the RF transceiver circuitry 1076, baseband processing circuitry 1078, and application processing circuitry 1080 may be on separate chipsets. In alternative embodiments, part or all of the baseband processing circuitry 1078 and application processing circuitry 1080 may be combined into one chipset, and the RF transceiver circuitry 1076 may be on a separate chipset. In still alternative embodiments, part or all of the RF transceiver circuitry 1076 and baseband processing circuitry 1078 may be on the same chipset, and the application processing circuitry 1080 may be on a separate chipset. In yet other alternative embodiments, part or all of the RF transceiver circuitry 1076, baseband processing circuitry 1078, and application processing circuitry 1080 may be combined in the same chipset. Processing circuitry 1074 may include, for example, one or more central processing units (CPUs), one or more microprocessors, one or more application specific integrated circuits (ASICs), and/or one or more field programmable gate arrays (FPGAs).

The radio network node 12 may include a power source 1084. The power source 1084 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 1072, processing circuitry 1074, and/or memory 1082. The power source 1084, battery, power supply circuitry, and/or power management circuitry are configured to supply radio network node 12, including processing circuitry 1074, with power for performing the functionality described herein.

Those skilled in the art will appreciate that alternative modules, units, or other means may be included in the user equipment 14 and/or radio network node 12 for performing the methods of FIGS. 16A-19B.

Figure 22B:
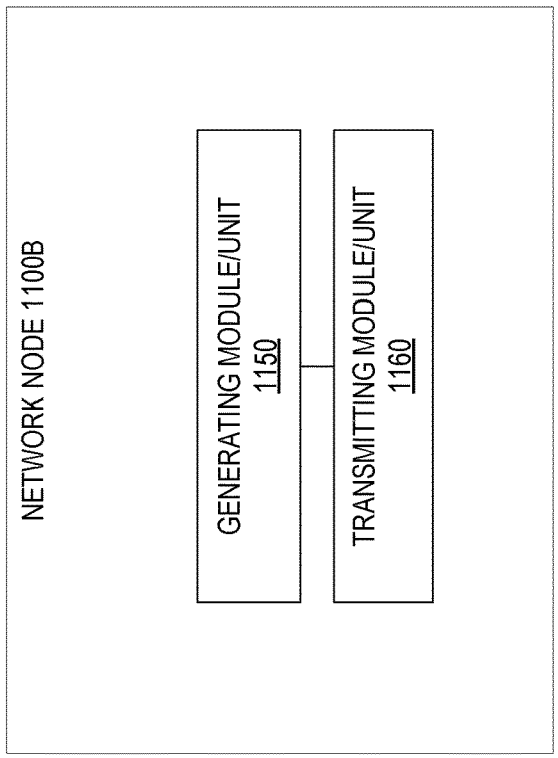
FIG. 22B is a block diagram of a network node according to other embodiments.
Figure 22A:
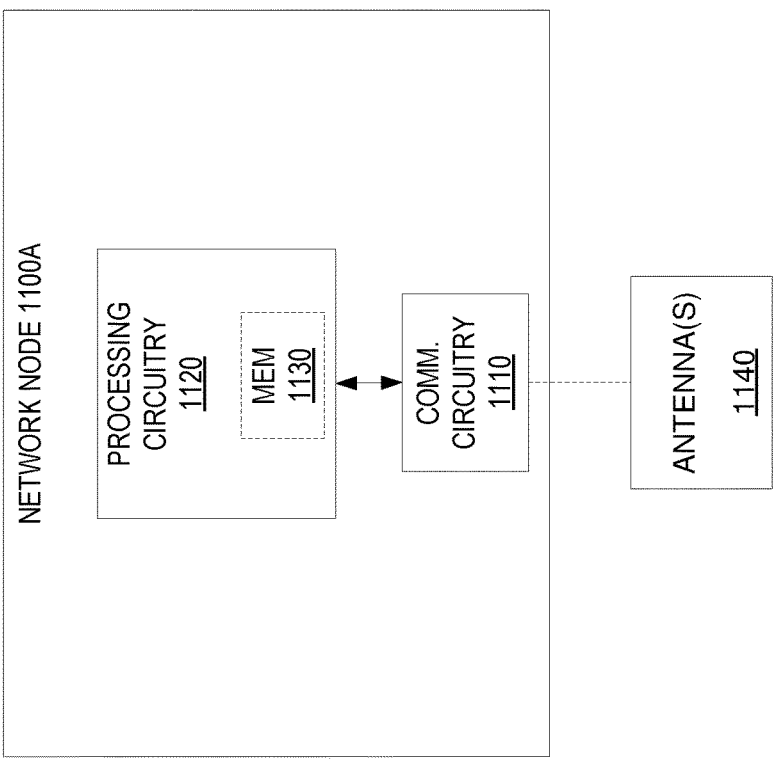
FIG. 22A is a block diagram of a network node according to some embodiments.

FIG. 22A illustrates additional details of a network node 1100A (e.g., a base station or a core network node) in accordance with one or more embodiments. As shown, the network node 1100A includes processing circuitry 1120 and communication circuitry 1110. The communication circuitry 110 may be configured to transmit via one or more antennas 140, e.g., in embodiments where the communication circuitry 1110 comprises radio circuitry. The processing circuitry 1120 is configured to perform processing described above, e.g., in FIGS. 17A and/or 19A, such as by executing instructions stored in memory 1130. The processing circuitry 1120 in this regard may implement certain functional means or units.

FIG. 22B illustrates a network node 1100B that according to other embodiments implements various functional means or units, e.g., via the processing circuitry 1120 in FIG. 22A. These functional means or units, e.g., for implementing the method in FIG. 17A, include for instance a generating module or unit 1150 for generating configuration information indicating one or more parameters for a frequency hopping pattern according to which the user equipment 14 is to generate each of the symbol groups on a single tone during a different time resource, wherein the frequency hopping pattern hops the random access preamble signal a pseudo random frequency distance at one or more other symbol groups. Also included is a transmitted module or unit 1160 for transmitting the configuration information to the user equipment 14.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a (transmitting or receiving) radio node, cause the radio node to perform as described above.

Embodiments further include a computer program product comprising program code portions for performing the steps of any of the embodiments herein when the computer program product is executed by a computing device. This computer program product may be stored on a computer readable recording medium.

Still further embodiments herein include the following enumerated embodiments.

As shown in FIG. 23A, a first enumerated embodiment includes a method 1200 implemented by a wireless communication device in a wireless communication system for transmitting a random access preamble signal, the method comprising: generating a random access preamble signal that comprises multiple symbol groups, with each symbol group on a single tone during a different time resource, according to a frequency hopping pattern that hops the single tone a fixed frequency distance at one or more symbol groups and hops the single tone one of multiple different possible frequency distances (e.g., a pseudorandom frequency distance) at one or more other symbol groups, wherein each symbol group comprises one or more symbols (Block 1210); and transmitting the random access preamble signal (Block 1220).

A second enumerated embodiment includes the method of the first enumerated embodiment, further comprising randomly selecting a single tone on which to generate a first one of the multiple symbol groups, and selecting to hop the single tone on which to generate subsequent ones of the multiple symbol groups according to the frequency hopping pattern.

As shown in FIG. 23B, a third enumerated embodiment includes a method 1300 implemented by a radio network node in a wireless communication system for receiving a random access preamble signal, the method comprising: receiving a signal from a wireless communication device (Block 1310); and processing the received signal in an attempt to detect a random access preamble that comprises multiple symbol groups, with each of the symbol groups on a single tone during a different time resource, according to a frequency hopping pattern that hops the single tone a fixed frequency distance at one or more symbol groups and hops the single tone one of multiple different possible frequency distances (e.g., a pseudorandom frequency distance) at one or more other symbol groups, wherein each symbol group comprises one or more symbols (Block 1320).

A fourth enumerated embodiment includes the method of the third enumerated embodiment, further comprising receiving one or more other signals from one or more other wireless communication devices, and processing the one or more other signals in an attempt to detect one or more other random access preambles multiplexed in frequency with the random access preamble, according to different frequency hopping patterns.

As shown in FIG. 24A, a fifth enumerated embodiment includes a method 1400 implemented by a network node in a wireless communication system for configuring a wireless communication device to transmit a random access preamble signal comprising multiple symbol groups, each symbol group comprising one or more symbols, the method comprising: generating configuration information indicating one or more parameters for a frequency hopping pattern according to which the wireless communication device is to generate each of the symbol groups on a single tone during a different time resource, wherein the frequency hopping pattern hops the single tone a fixed frequency distance at one or more symbol groups and hops the single tone one of multiple different possible frequency distances (e.g., a pseudorandom frequency distance) at one or more other symbol groups (Block 1410); and transmitting the configuration information to the wireless communication device (Block 1420).

A sixth enumerated embodiment includes the method of the fifth enumerated embodiment, further comprising configuring multiple different frequency bands in which random access preamble signals for different types of wireless communication devices are to be transmitted, wherein the different frequency bands have different numbers of tones therein.

A seventh enumerated embodiment includes the method of any of the fifth through sixth enumerated embodiments, wherein the configuration information indicates at least one parameter indicating in which band the wireless communication device is to transmit a random access preamble signal and/or a number of tones in the band.

An eighth enumerated embodiment includes the method of any of the first through seventh enumerated embodiments, wherein the fixed frequency distances is less than or equal to a frequency distance threshold associated with a targeted cell size and/or a targeted time-of-arrival estimation range, and at least one of the multiple different possible frequency distances is greater than the frequency distance threshold.

A ninth enumerated embodiment includes the method of the eighth enumerated embodiment, wherein the frequency distance threshold is a frequency distance spanned by one tone.

A tenth enumerated embodiment includes the method of the eighth enumerated embodiment, wherein the frequency distance threshold is a frequency distance spanned by two tones.

An eleventh enumerated embodiment includes the method of any of the first through tenth enumerated embodiments, wherein the multiple different possible frequency distances comprise pseudo-randomly generated frequency distances.

A twelfth enumerated embodiment includes The method of any of the first through eleventh enumerated embodiments, wherein the frequency distance to hop at each of said one or more other symbol groups is pseudo randomly selected from among the multiple different possible frequency distances.

A thirteenth enumerated embodiment includes the method of any of the first through twelfth enumerated embodiments, wherein the frequency hopping pattern hops the single tone a fixed frequency distance at each symbol group in a first set of one or more symbol groups, and hops the single tone one of multiple different possible frequency distances at each symbol group in a second set of one or more symbol groups different than the first set.

A fourteenth enumerated embodiment includes the method of any of the first through thirteenth enumerated embodiments, wherein the frequency hopping pattern comprises a combination of a fixed distance hopping pattern and a multi-distance hopping pattern, wherein the fixed distance hopping pattern hops the single tone a fixed frequency distance at each symbol group in a first set of one or more symbol groups, and the multi-distance hopping pattern hops the single tone one of multiple different possible frequency distances at each symbol group in a second set of one or more symbol groups different than the first set.

A fifteenth enumerated embodiment includes the method of the fourteenth enumerated embodiment, wherein the multi-distance hopping pattern is a pseudo-random hopping pattern.

A sixteenth enumerated embodiment includes the method of any of the thirteenth through fifteenth enumerated embodiment, wherein the symbol groups in the first and second sets are interlaced in time and are non-overlapping, with both the first and second sets including every other symbol group.

A seventeenth enumerated embodiment includes the method of any of the thirteenth through sixteenth enumerated embodiments, wherein a frequency distance hopped at a symbol group in the second set is selected from candidate frequency distances that include 0, 1, . . . and $N_b^{sc}-1$ multiples of a frequency distance spanned by a single tone, wherein $N_b^{sc}$ is a number of tones in a transmission bandwidth of the random access preamble signal.

An eighteenth enumerated embodiment includes the method of any of the thirteenth through sixteenth enumerated embodiments, wherein a frequency distance hopped at a symbol group in the second set is selected from candidate frequency distances that include 0, $N_{sb}^{sc}$, $2N_{sb}^{sc}$, . . . , and $N_b^{sc}-N_{sb}^{sc}$ multiples of a frequency distance spanned by a single tone, wherein $N_b^{sc}$ is a number of tones in a transmission bandwidth of the random access preamble signal, wherein $N_{sb}^{sc}$ is a number of tones in any given subband.

A nineteenth enumerated embodiment includes the method of any of the first through eighteenth enumerated embodiments, wherein the fixed distance hopping pattern hops the single tone the fixed frequency distance at a symbol group in a direction that depends on a frequency location of the symbol group.

A twentieth enumerated embodiment includes the method of any of the first through eighteenth enumerated embodiments, wherein the fixed distance hopping pattern hops the single tone the fixed frequency distance at each symbol group in the same direction.

A twenty-first enumerated embodiment includes the method of any of the first through twentieth enumerated embodiments, wherein the frequency hopping pattern hops the single tone across a transmission bandwidth of the random access preamble signal, such that the multiple symbol groups span the transmission bandwidth.

A twenty-second enumerated embodiment includes the method of any of the first through twenty-first enumerated embodiments, wherein a time resource comprises an Orthogonal Frequency Division Multiplexing symbol group interval.

A twenty-third enumerated embodiment includes the method of any of the first through twenty-second enumerated embodiments, wherein a tone is an Orthogonal Frequency Division Multiplexing subcarrier.

A twenty-fourth enumerated embodiment includes the method of any of the first through twenty-third enumerated embodiments, wherein the wireless communication device is a narrowband Internet of Things (NB-IoT) device.

A twenty-fifth enumerated embodiment includes the method of any of the first through twenty-fourth enumerated embodiments, wherein the random access preamble signal is transmitted over a narrowband Physical Random Access Channel (PRACH).

A twenty-sixth enumerated embodiment includes a wireless communication device in a wireless communication system for transmitting a random access preamble signal, the wireless communication device configured to: generate a random access preamble signal that comprises multiple symbol groups, with each symbol group on a single tone during a different time resource, according to a frequency hopping pattern that hops the single tone a fixed frequency distance at one or more symbol groups and hops the single tone one of multiple different possible frequency distances at one or more other symbol groups, wherein each symbol group comprises one or more symbols; and transmit the random access preamble signal.

A twenty-seventh enumerated embodiment includes the wireless communication device of the twenty-sixth enumerated embodiment, configured to perform the method of any of the second and eight through twenty-fifth enumerated embodiments.

A twenty-eighth enumerated embodiment includes a wireless communication device in a wireless communication system for transmitting a random access preamble signal, the wireless communication device comprising: a generating module for generating a random access preamble signal that comprises multiple symbol groups, with each symbol group on a single tone during a different time resource, according to a frequency hopping pattern that hops the single tone a fixed frequency distance at one or more symbol groups and hops the single tone one of multiple different possible frequency distances at one or more other symbol groups, wherein each symbol group comprises one or more symbols; and a transmitting module for transmitting the random access preamble signal.

A twenty-ninth enumerated embodiment includes a radio network node in a wireless communication system for receiving a random access preamble signal, the radio network node configured to: receive a signal from a wireless communication device; and process the received signal in an attempt to detect a random access preamble that comprises multiple symbol groups, with each of the symbol groups on a single tone during a different time resource, according to a frequency hopping pattern that hops the single tone a fixed frequency distance at one or more symbol groups and hops the single tone one of multiple different possible frequency distances at one or more other symbol groups, wherein each symbol group comprises one or more symbols.

A twenty-ninth enumerated embodiment includes a radio network node of the twenty-ninth enumerated embodiment, configured to perform the method of any of the fourth and eighth through twenty-fifth enumerated embodiments.

A thirtieth enumerated embodiment includes a radio network node in a wireless communication system for receiving a random access preamble signal, the radio network node comprising: a receiving module for receiving a signal from a wireless communication device; and a processing module for processing the received signal in an attempt to detect a random access preamble that comprises multiple symbol groups, with each of the symbol groups on a single tone during a different time resource, according to a frequency hopping pattern that hops the single tone a fixed frequency distance at one or more symbol groups and hops the single tone one of multiple different possible frequency distances at one or more other symbol groups, wherein each symbol group comprises one or more symbols.

A thirty-second enumerated embodiment includes a network node in a wireless communication system for configuring a wireless communication device to transmit a random access preamble signal comprising multiple symbol groups, each symbol group comprising one or more symbols, the network node configured to: generate configuration information indicating one or more parameters for a frequency hopping pattern according to which the wireless communication device is to generate each of the symbol groups on a single tone during a different time resource, wherein the frequency hopping pattern hops the single tone a fixed frequency distance at one or more symbol groups and hops the single tone one of multiple different possible frequency distances at one or more other symbol groups; and transmit the configuration information to the wireless communication device.

A thirty-third enumerated embodiment includes a network node of the thirty-second enumerated embodiment, configured to perform the method of any of the sixth through twenty-fifth enumerated embodiments.

A thirty-fourth enumerated embodiment includes a network node in a wireless communication system for configuring a wireless communication device to transmit a random access preamble signal comprising multiple symbol groups, each symbol group comprising one or more symbols, the network node comprising: a generating module for generating configuration information indicating one or more parameters for a frequency hopping pattern according to which the wireless communication device is to generate each of the symbol groups on a single tone during a different time resource, wherein the frequency hopping pattern hops the single tone a fixed frequency distance at one or more symbol groups and hops the single tone one of multiple different possible frequency distances at one or more other symbol groups; and a transmitting module for transmitting the configuration information to the wireless communication device.

A thirty-fifth enumerated embodiment includes a computer program comprising instructions which, when executed by at least one processor of a node, causes the node to perform the method of any of the first through twenty-fifth enumerated embodiments.

A thirty-sixth enumerated embodiment includes a carrier containing the computer program of the thirty-fifth enumerated embodiment, wherein the carrier is one of an electronic signal, optical signal, radio signal, or computer readable storage medium.

As shown in FIG. 24B, another embodiment includes a method 1500 implemented by a wireless communication device in a wireless communication system for configuring the wireless communication device to transmit a random access preamble signal comprising multiple symbol groups, each symbol group comprising one or more symbols, the method comprising: receiving configuration information indicating one or more parameters for a frequency hopping pattern according to which the wireless communication device is to generate each of the symbol groups on a single tone during a different time resource, wherein the frequency hopping pattern hops the single tone a fixed frequency distance at one or more symbol groups and hops the single tone one of multiple different possible frequency distances (e.g., a pseudorandom frequency distance) at one or more other symbol groups (Block 1510); and configuring the wireless communication device to generate the random access signal according to the received configuration information (Block 1520).

Those skilled in the art will recognize that the present invention may be carried out in other ways than those specifically set forth herein without departing from essential characteristics of the invention. The present embodiments are thus to be considered in all respects as illustrative and not restrictive.

What is claimed is:

1. A method implemented by a user equipment configured for use in a wireless communication system, the method comprising:
generating a random access preamble signal that comprises multiple symbol groups, with each symbol group on a single tone during a different time resource, according to a frequency hopping pattern that hops the random access preamble signal a fixed frequency distance from at least one of the symbol groups to an adjacent symbol group in a first pair of adjacent symbol groups in the random access preamble signal and hops the random access preamble signal a pseudo random frequency distance from at least one of the symbol groups to an adjacent symbol group in a second pair of adjacent symbol groups in the random access preamble signal, wherein each symbol group comprises two or more symbols; and
transmitting the random access preamble signal.

2. The method of claim 1, further comprising randomly selecting a single tone on which to transmit a first one of the multiple symbol groups, and selecting the single tones on which to respectively transmit subsequent ones of the multiple symbol groups according to the frequency hopping pattern.

3. The method of claim 1, wherein the pseudo random frequency distance is a function of: $f_{hop}(i)=(f_{hop}(i-1)+(\sum_{k=i*10+1}^{i*10+9} c(k)*2^{k-(i*10+1)}) \mod(N_b^{sc}-1)+1) \mod N_b^{sc}$, wherein $$i = \frac{t}{T},$$

wherein t is a symbol group index, wherein the random access preamble signal hops a pseudo random frequency distance every T symbol groups, wherein $N_b^{sc}$ is a number of tones within which hopping is defined for the random access preamble signal, and c(k) is a pseudo random sequence.

4. The method of claim 1, wherein the pseudo random frequency distance is a function of: $f_{hop}(i)=(f_{hop}(i-1)+(\Sigma_{k=i*10+1}^{i*10+9}c(k)*2^{k-(i*10+1)})\mod(N_b^{sc}-1)+1) \mod N_b^{sc}$, wherein $N_b^{sc}$ is a number of tones within which hopping is defined for the random access preamble signal, wherein c(k) is a pseudo random sequence, and wherein i=0, 1, 2, . . . is an index of consecutive pseudo random frequency hops in the frequency hopping pattern.

5. The method of claim 3, wherein the pseudo random sequence c(k) comprises a sequence of length $M_{PN}$, where k=0, 1, . . . , $M_{PN}$−1, and is defined by $c(k)=(x_1(k+N_C)+x_2(k+N_C))\mod 2$ $x_1(k+31)=(x_1(k+3)+x_1(k))\mod 2$ $x_2(k+31)=(x_2(k+3)+x_2(k+2)+x_2(k+1)+x_2(k))\mod 2$ where $N_C$=1600, $x_1(0)$=1, $x_1(k)$=0, k=1, 2, . . . , 30, $c_{init}=\Sigma_{i=0}^{30}x_2(i)\cdot 2^i$, and $c_{init}=N_{ID}^{Ncell}$ is a physical-layer cell identity.

6. The method of claim 1, wherein the pseudo random frequency distance is a function of a cell identity.

7. The method of claim 1, wherein the fixed frequency distance comprises a frequency distance of a single tone.

8. The method of claim 1, wherein each symbol group in the random access preamble signal comprises a cyclic prefix.

9. The method of claim 1, wherein the frequency hopping pattern hops the random access preamble signal a fixed frequency distance at each symbol group in a first set of one or more symbol groups, and hops the random access preamble signal a pseudo random frequency distance at each symbol group in a second set of one or more symbol groups different than the first set.

10. A method implemented by a radio network node configured for use in a wireless communication system, the method comprising:
receiving a signal from a user equipment; and
processing the received signal in an attempt to detect a random access preamble signal that comprises multiple symbol groups, with each of the symbol groups on a single tone during a different time resource, according to a frequency hopping pattern that hops the random access preamble signal a fixed frequency distance from at least one of the symbol groups to an adjacent symbol group in a first pair of adjacent symbol groups in the random access preamble signal and hops the random access preamble signal a pseudo random frequency distance from at least one of the symbol groups to an adjacent symbol group in a second pair of adjacent symbol groups in the random access preamble signal, wherein each symbol group comprises two or more symbols.

11. The method of claim 10, further comprising receiving one or more other signals from one or more other user equipments, and processing the one or more other signals in an attempt to detect one or more other random access preamble signals multiplexed in frequency with the random access preamble signal, according to different frequency hopping patterns.

12. A user equipment for use in a wireless communication system for transmitting a random access preamble signal, the user equipment comprising:
processing circuitry and radio circuitry, whereby the user equipment is configured to:
generate a random access preamble signal that comprises multiple symbol groups, with each symbol group on a single tone during a different time resource, according to a frequency hopping pattern that hops the random access preamble signal a fixed frequency distance from at least one of the symbol groups to an adjacent symbol group in a first pair of adjacent symbol groups in the random access preamble signal and hops the random access preamble signal a pseudo random frequency distance from at least one of the symbol groups to an adjacent symbol group in a second pair of adjacent symbol groups in the random access preamble signal, wherein each symbol group comprises two or more symbols; and
transmit the random access preamble signal.

13. The user equipment of claim 12, wherein the user equipment is configured to randomly select a single tone on which to transmit a first one of the multiple symbol groups, and select the single tones on which to respectively transmit subsequent ones of the multiple symbol groups according to the frequency hopping pattern.

14. The user equipment of claim 12, wherein the pseudo random frequency distance is a function of: $f_{hop}(i)=(f_{hop}(i-1)+(\Sigma_{k=i*10+1}^{i*10+9}c(k)*2^{k-(i*10+1)})\mod(N_b^{sc}-1)+1) \mod N_b^{sc}$, wherein $$i = \frac{t}{T},$$

wherein t is a symbol group index, wherein the random access preamble signal hops a pseudo random frequency distance every T symbol groups, wherein $N_b^{sc}$ is a number of tones within which hopping is defined for the random access preamble signal, and c(k) is a pseudo random sequence.

15. The user equipment of claim 12, wherein the pseudo random frequency distance is a function of: $f_{hop}(i)=(f_{hop}(i-1)+(\Sigma_{k=i*10+1}^{i*10+9}c(k)*2^{k-(i*10+1)})\mod(N_b^{sc}-1)+1) \mod N_b^{sc}$, wherein $N_b^{sc}$ is a number of tones within which hopping is defined for the random access preamble signal, wherein c(k) is a pseudo random sequence, and wherein i=0, 1, 2, . . . is an index of consecutive pseudo random frequency hops in the frequency hopping pattern.

16. The user equipment of claim 14, wherein the pseudo random sequence c(k) comprises a sequence of length $M_{PN}$, where k=0, 1, . . . , $M_{PN}$−1, and is defined by $c(k)=(x_1(k+N_C)+x_2(k+N_C))\mod 2$ by $x_1(k+31)=(x_1(k+3)+x_1(k))\mod 2$ $x_2(k+31)=(x_2(k+3)+x_2(k+2)+x_2(k+1)+x_2(k))\mod 2$ where $N_C$=1600, $x_1(0)$=1, $x_1(k)$=0, k=1, 2, . . . , 30, $c_{init}=\Sigma_{i=0}^{30}x_2(i)\cdot 2^i$, and $c_{init}=N_{ID}^{Ncell}$, and $N_{ID}^{cell}$ is a physical-layer cell identity.

17. The user equipment of claim 12, wherein the pseudo random frequency distance is a function of a cell identity.

18. The user equipment of claim 12, wherein the fixed frequency distance comprises a frequency distance of a single tone.

19. The user equipment of claim 12, wherein each symbol group in the random access preamble signal comprises a cyclic prefix.

20. The user equipment of claim 12, wherein the frequency hopping pattern hops the random access preamble signal a fixed frequency distance at each symbol group in a first set of one or more symbol groups, and hops the random access preamble signal a pseudo random frequency distance at each symbol group in a second set of one or more symbol groups different than the first set.

21. A radio network node for use in a wireless communication system for receiving a random access preamble signal, the radio network node comprising:
processing circuitry and radio circuitry, whereby the radio network node is configured to:
receive a signal from a user equipment; and
process the received signal in an attempt to detect a random access preamble signal that comprises multiple symbol groups, with each of the symbol groups on a single tone during a different time resource, according to a frequency hopping pattern that hops the random access preamble signal a fixed frequency distance from at least one of the symbol groups to an adjacent symbol group in a first pair of adjacent symbol groups in the random access preamble signal and hops the random access preamble signal a pseudo random frequency distance from at least one of the symbol groups to an adjacent symbol group in a second pair of adjacent symbol groups in the random access preamble signal, wherein each symbol group comprises two or more symbols.

22. The radio network node of claim 21, wherein the radio network node is configured to receive one or more other signals from one or more other user equipments, and process the one or more other signals in an attempt to detect one or more other random access preamble signals multiplexed in frequency with the random access preamble signal, according to different frequency hopping patterns.

23. The radio network node of claim 21, wherein the pseudo random frequency distance is a function of: $f_{hop}(i) = (f_{hop}(i-1) + (\Sigma_{k=i*10+1}^{i*10+9} c(k)*2^{k-(i*10+1)}) \mod (N_b^{sc}-1) + 1) \mod N_b^{sc}$, wherein $i = \frac{t}{T}$, wherein t is a symbol group index, wherein the random access preamble signal hops a pseudo random frequency distance every T symbol groups, wherein $N_b^{sc}$ is a number of tones within which hopping is defined for the random access preamble signal, and c(k) is a pseudo random sequence.

24. The radio network node of claim 21, wherein the pseudo random frequency distance is a function of: $f_{hop}(i) = (f_{hop}(i-1) + (\Sigma_{k=i*10+1}^{i*10+9} c(k)*2^{k-(i*10+1)}) \mod (N_b^{sc}-1) + 1) \mod N_b^{sc}$, wherein $N_b^{sc}$ is a number of tones within which hopping is defined for the random access preamble signal, wherein c(k) is a pseudo random sequence, and wherein i=0, 1, 2, . . . is an index of consecutive pseudo random frequency hops in the frequency hopping pattern.

25. The radio network node of claim 23, wherein the pseudo random sequence c(k) comprises a sequence of length $M_{PN}$, where k=0, 1, . . . , $M_{PN}-1$, and is $c(k)=(x_1(k+N_C)+x_2(k+N_C)) \mod 2$ defined by $x_1(k+31)=(x_1(k+3)+x_1(k)) \mod 2$ $x_2(k+31)=(x_2(k+3)+x_2(k+2)+x_2(k+1)+x_2(k)) \mod 2$ where $N_C=1600$, $x_1(0)=1$, $x_1(k)=0$, k=1, 2, . . . , 30, $c_{init}=\Sigma_{i=0}^{30} x_2(i) \cdot 2^i$, and $c_{init}=N_{ID}^{Ncell}$, and $N_{ID}^{cell}$ is a physical-layer cell identity.

26. The radio network node of claim 21, wherein the pseudo random frequency distance is a function of a cell identity.

27. The radio network node of claim 21, wherein the fixed frequency distance comprises a frequency distance of a single tone.

28. The radio network node of claim 21, wherein each symbol group in the random access preamble signal comprises a cyclic prefix.

29. The radio network node of claim 21, wherein the frequency hopping pattern hops the random access preamble signal a fixed frequency distance at each symbol group in a first set of one or more symbol groups, and hops the random access preamble signal a pseudo random frequency distance at each symbol group in a second set of one or more symbol groups different than the first set.

* * * * *